(12) United States Patent
Nakagawa et al.

(10) Patent No.: US 6,769,273 B1
(45) Date of Patent: Aug. 3, 2004

(54) METHOD OF MANUFACTURING SILICA GLASS MEMBER AND SILICA GLASS MEMBER OBTAINED BY THE METHOD

(75) Inventors: Kazuhiro Nakagawa, Sagamihara (JP); Hiroyuki Hiraiwa, Yokohama (JP)

(73) Assignee: Nikon Corporation, Tokyo (JP)

( * ) Notice: Subject to any disclaimer, the term of this patent is extended or adjusted under 35 U.S.C. 154(b) by 262 days.

(21) Appl. No.: 09/786,470

(22) PCT Filed: Jul. 5, 2000

(86) PCT No.: PCT/JP00/04466
§ 371 (c)(1),
(2), (4) Date: Mar. 5, 2001

(87) PCT Pub. No.: WO01/02311
PCT Pub. Date: Jan. 11, 2001

(30) Foreign Application Priority Data

Jul. 5, 1999 (JP) ........................................ 1999-190117

(51) Int. Cl.[7] .............................. G01N 23/00; C03C 3/06
(52) U.S. Cl. .............................. 65/378; 65/413; 65/421; 501/905
(58) Field of Search ........................ 15/413, 415, 421, 15/378; 501/400, 53, 54, 55, 905; 359/494, 355

(56) References Cited

U.S. PATENT DOCUMENTS

| | | | | |
|---|---|---|---|---|
| 5,776,219 A | * | 7/1998 | Jinbo et al. | 65/31 |
| 6,047,014 A | * | 4/2000 | Hyuga et al. | 372/108 |
| 6,129,987 A | * | 10/2000 | Jinbo et al. | 428/426 |
| 6,181,469 B1 | * | 1/2001 | Hiraiwa et al. | 359/355 |
| 6,423,656 B1 | * | 7/2002 | Coriand et al. | 501/54 |

FOREIGN PATENT DOCUMENTS

| | | | |
|---|---|---|---|
| EP | 0 401 845 A2 | 12/1990 | |
| EP | 0 870 737 A1 | 10/1998 | |
| EP | 1 114 802 A1 * | 7/2001 | ............ C03C/3/06 |
| JP | A 8-5801 | 1/1996 | |
| JP | A 8-107060 | 4/1996 | |
| JP | A 8-268726 | 10/1996 | |
| JP | A 9-52722 | 2/1997 | |
| JP | A 11-54411 | 2/1999 | |
| JP | A 2000-7349 | 1/2000 | |
| WO | WO 98/00761 | 1/1998 | |
| WO | 98/40319 * | 9/1998 | ............ C03C/3/06 |
| WO | WO 98/52879 | 11/1998 | |

* cited by examiner

Primary Examiner—Steven P. Griffin
Assistant Examiner—Carlos Lopez
(74) Attorney, Agent, or Firm—Oliff & Berridge, PLC

(57) ABSTRACT

A silica glass member manufacturing method of the present invention includes the steps of making a silicon compound react in oxyhydrogen flame using a burner having a multi-tubular structure to obtain fine silica glass particles, depositing the fine silica glass particles on a support rotating and placed to oppose the burner to obtain a silica glass ingot with a temperature distribution in at least one plane perpendicular to a rotational axis of the silica glass ingot, the temperature distribution being symmetrical with respect to the rotational axis and having a maximal value between a center and a peripheral portion of the plane, and obtaining a distribution of signed birefringence values on the basis of birefringence values and directions of phase advance axes measured at a plurality of points in the plane perpendicular to the rotational axis of the silica glass ingot and cutting, from the silica glass ingot, a silica glass member whose signed birefringence values monotonously increase from the center to the peripheral portion of the plane.

8 Claims, 18 Drawing Sheets

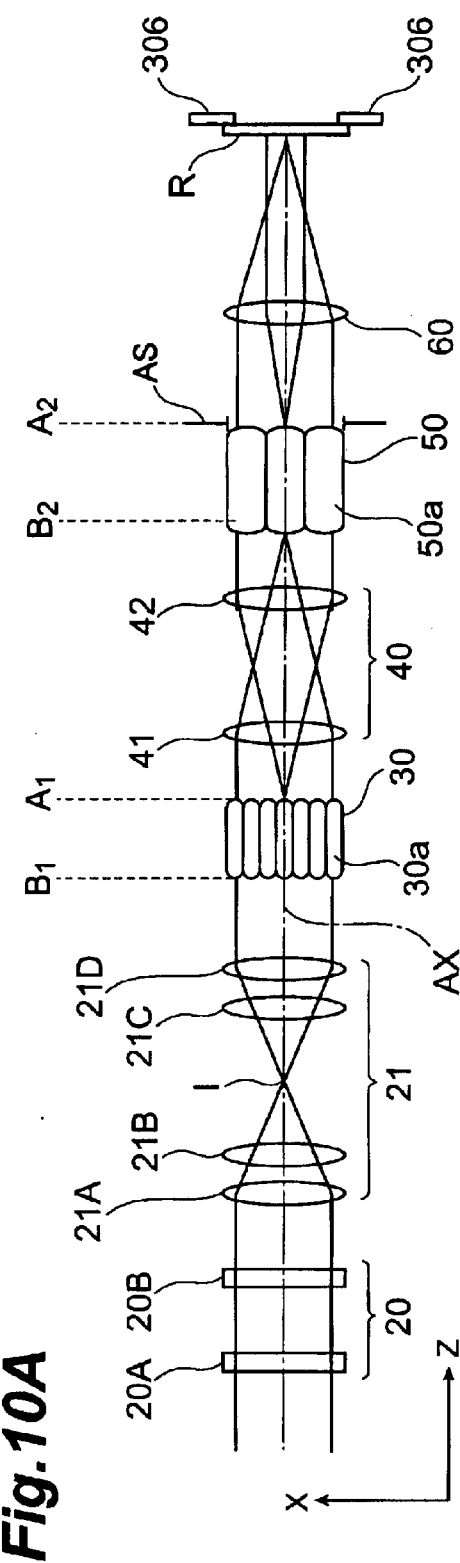
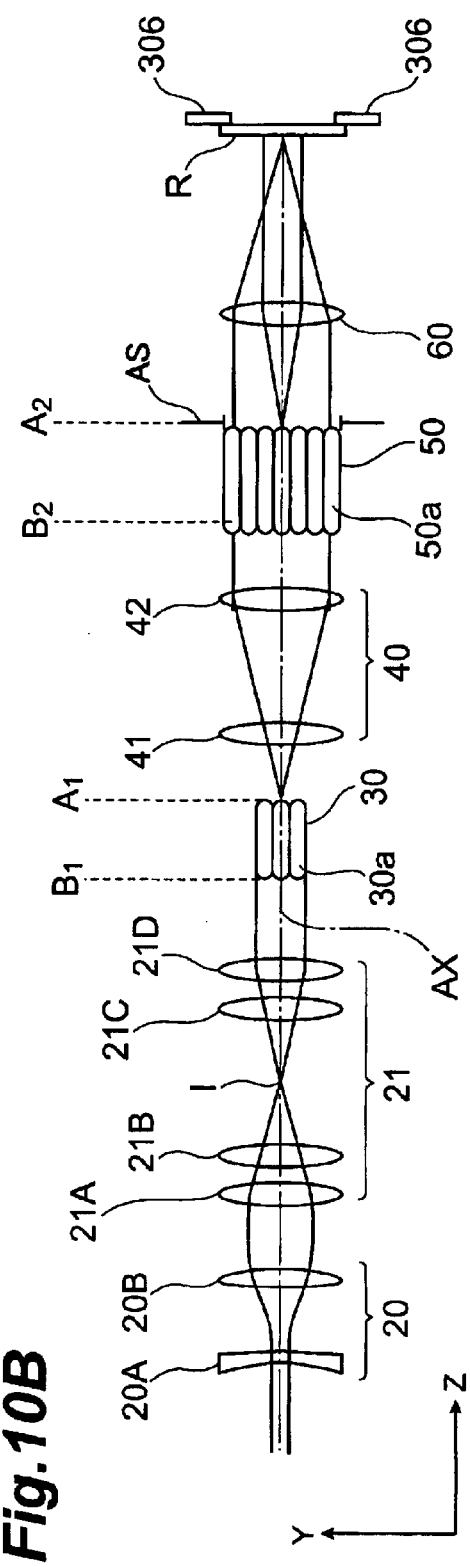
Fig. 10A
Fig. 10B

US 6,769,273 B1

METHOD OF MANUFACTURING SILICA GLASS MEMBER AND SILICA GLASS MEMBER OBTAINED BY THE METHOD

TECHNICAL FIELD

The present invention relates to a method of manufacturing a silica glass member and a silica glass member obtained by the method and, more particularly, to a method of manufacturing a silica glass member suitably used for an imaging optical system such as an illumination optical system or projection optical system in a projection exposure apparatus for transferring a predetermined mask pattern onto a substrate, and a silica glass member obtained by the method.

BACKGROUND ART

As a projection exposure apparatus, an apparatus having a structure as shown in FIGS. 18A and 18B is conventionally used.

More specifically, in the projection exposure apparatus shown in FIG. 18A, a light beam from a light source 501 such as a mercury arc lamp is condensed by an elliptical mirror 502 and then converted into a parallel light beam by a collimator lens 503. This parallel light beam passes through a fly-eye lens 504 comprised of a set of optical elements 504a each having a rectangular section as shown in FIG. 18, so a plurality of light source images are formed on the exit side of the fly-eye lens. An aperture stop 505 having a circular aperture portion is placed at the light source image position. Light beams from the plurality of light source images are condensed by a condenser lens 506 so a reticle R as a target illumination object is uniformly illuminated in a superposed manner.

A pattern on the reticle R thus uniformly illuminated with the illumination optical system is projected/exposed to a wafer W with a resist coated thereon, by a projection optical system 507 constituted by a plurality of lenses. This wafer W is placed on a wafer stage WS that two-dimensionally moves. In the projection exposure apparatus shown in FIG. 18A, exposure of so-called step-and-repeat scheme is performed so that when exposure in one shot region on the wafer is ended, the wafer stage is sequentially two-dimensionally moved for exposure to the next shot region.

In recent years, a scanning exposure scheme has been proposed in which the pattern on the reticle R can be transferred onto the wafer W at high throughput by irradiating the reticle R with a rectangular or arc light beam and scanning the reticle R and wafer W, which are conjugate with respect to the projection optical system 507, in predetermined directions.

In either projection exposure apparatus, an optical member used in its optical system is required to have a high transmittance for exposure light used. This is because the optical system of the projection exposure apparatus is formed by combining a number of optical members, and if optical losses of the number of optical members used are integrated, the influence of total decrease in transmittance becomes large althrough the optical loss per lens is small. When an optical member having a low transmittance is used, it absorbs exposure light and increases the temperature of the optical member, resulting in uneven refractive index. Additionally, the polished surface deforms due to local thermal expansion of the optical member. This degrades the optical performance.

In the projection optical system, the optical member is required to have a highly uniform refractive index in order to obtain a finer and clearer projected/exposed pattern. The reason for this is that a propagation delay of light occurs due to an unenen refractive index, greatly affecting the imaging performance of the projection optical system.

As a material of an optical member used in the optical system of a projection exposure apparatus using UV light (wavelength: 400 nm or less), silica glass or calcium fluoride crystal, which has a high transmittance for UV light and is excellent in uniformity, is generally used.

Furthermore, a technique has been recently proposed in which the wavelength of the light source is shortened to transfer a finer mask pattern image onto a wafer surface, i.e., improve the resolution. For example, the wavelength is shortened from conventional g line (wavelength: 436 nm) or i line (wavelength: 365 nm) to KrF (wavelength: 248 nm) or ArF (wavelength: 193 nm) excimer laser.

In projection exposure using such a short-wavelength excimer laser, since it aims at obtaining a finer mask pattern, a material having more excellent characteristics for the transmittance or uniformity of refractive index is used.

However, even a material having high and uniform transmittance and refractive index does not always present a desired resolution when a plurality of materials are combined to form an optical system.

DISCLOSURE OF THE INVENTION

The present invention has been made in consideration of the above problems of the prior art, and has as its object to provide a method of manufacturing a silica glass member, which makes it possible to efficiently and properly obtain a silica glass member necessary for obtaining a sufficiently high resolution in the imaging optical system of a projection exposure apparatus, and a silica glass member obtained by the manufacturing method.

As a result of extensive studies aiming at achieving the above object, the present inventors have found that the imaging performance of a projection optical system and the resolution of a projection exposure apparatus are affected by the birefringence of an optical member, and when the magnitude of the birefringence, i.e., the birefringence value (absolute value) of an optical member is 2 nm/cm or less, and the distribution of birefringence values in the optical member has a central symmetry, imaging performance close to the designed performance of the projection optical system and a resolution close to the designed performance of the projection exposure apparatus are obtained, and have disclosed it in Japanese Patent Laid-Open No. 8-107060.

However, when the required resolution of a projection exposure apparatus further rises, and light having a shorter wavelength is used as exposure light, or an optical member having a large diameter and thickness is used, no satisfactory imaging performance of the projection optical system and no satisfactory resolution of the projection exposure apparatus can be obtained even by employing the conventional design concept.

As a result of more extensive studies, the present inventors have found, as a reason why a projection optical system and projection exposure apparatus having desired optical performance cannot be obtained even by using an optical member having a satisfactory transmittance or satisfactorily uniform refractive index, that since the optical members have birefringence value distributions, respectively, and the birefringence value distributions are integrated in the entire optical system when a plurality of optical members are combined as a projection optical system, the light wavefront of the entire optical system is disturbed, adversely affecting the imaging performance of the projection optical system or resolution of the projection exposure apparatus.

More specifically, the conventional evaluation of the birefringence value of an optical member is done only on the basis of its magnitude (absolute value), and there is no concept of the birefringence value distribution of an optical member. For example, to measure the birefringence value of a silica glass member, birefringence values are measured at several points near 95% of the diameter of the member, and the maximum value is used as the birefringence value of the member, as recognized by those who skilled in the art. However, the present inventors measured the distribution of birefringence values of a silica glass member in detail and found that the birefringence values actually have an uneven distribution.

Hence, even for a silica glass member having a highly uniform refractive index, the influence of birefringence in the member cannot be sufficiently evaluated only by managing the maximum value of the birefringence values in the member. Especially, it is very hard to obtain an optical system having desired performance by combining a plurality of members.

As described above, since the evaluation of birefringence in the entire optical system constituted by a plurality of optical members cannot be simply represented only by the magnitudes (absolute values) of the birefringence values of the respective optical members, the present inventors examined in detail the influence that is given to the optical system by the uneven birefringence value distributions in the optical members. The present inventors consequently found by examining the uneven birefringence value distribution in an optical member in consideration of the direction of phase advance axis that in synthesis of silica glass by a direct method, and subsequent annealing or high-temperature heat treatment, it is difficult to control the direction of phase advance axis in the birefringence value distribution of a silica glass member by the conventional method, and also since a plurality of silica glass members obtained by this method have birefringence value distributions with the same phase advance axis direction, the birefringence values are integrated to adversely affect an optical system constituted using these members. The present inventors also found that by controlling a silica glass ingot obtained in the silica glass member manufacturing process to have a specific temperature distribution, a silica glass member having a birefringence value distribution with a phase advance axis direction different for that of the silica glass member obtained by the above congenital manufacturing method can be obtained, and completed the present invention.

More specifically, the first silica glass member manufacturing method of the present invention comprises:

a first step of making a silicon compound react in oxyhydrogen flame using a burner having a multi-tubular structure to obtain fine silica glass particles;

a second step of depositing the fine silica glass particles on a support rotating and placed to oppose the burner to obtain a silica glass ingot with a temperature distribution in at least one plane perpendicular to a rotational axis of the silica glass ingot, the temperature distribution being symmetrical with respect to the rotational axis and having a maximal value between a center and a peripheral portion of the plane; and a third step of obtaining a distribution of signed birefringence values on the basis of birefringence values and directions of phase advance axes measured at a plurality of points in the plane perpendicular to the rotational axis of the silica glass ingot and cutting, from the silica glass ingot, a silica glass member whose signed birefringence values monotonously increase from the center to the peripheral portion of the plane.

The second silica glass member manufacturing method of the present invention comprises:

a fourth step of heating a silica glass ingot to a predetermined temperature;

a fifth step of cooling the silica glass ingot with a temperature distribution in at least one plane perpendicular to a rotational axis of the silica glass ingot, the temperature distribution being symmetrical with respect to the rotational axis and having a maximal value between a center and a peripheral portion of the plane; and a sixth step of obtaining a distribution of signed birefringence values on the basis of birefringence values and directions of phase advance axes measured at a plurality of points in the plane perpendicular to the rotational axis of the silica glass ingot and cutting, from the silica glass ingot, a silica glass member whose signed birefringence values monotonously increase from the center to the peripheral portion of the plane.

The first silica glass member of the present invention is a silica glass member having a distribution of signed birefringence values, in which the signed birefringence values monotonously increase from a center to a peripheral portion of the plane, the silica glass member being obtained by a manufacturing method comprising:

a first step of making a silicon compound react in oxyhydrogen flame using a burner having a multi-tubular structure to obtain fine silica glass particles;

a second step of depositing the fine silica glass particles on a support rotating and placed to oppose the burner to obtain a silica glass ingot with a temperature distribution in at least one plane perpendicular to a rotational axis of the silica glass ingot, the temperature distribution being symmetrical with respect to the rotational axis and having a maximal value between the center and the peripheral portion of the plane; and a third step of obtaining a distribution of signed birefringence values on the basis of birefringence values and directions of phase advance axes measured at a plurality of points in the plane perpendicular to the rotational axis of the silica glass ingot and cutting, from the silica glass ingot, a silica glass member whose signed birefringence values monotonously increase from the center to the peripheral portion of the plane.

The second silica glass member of the present invention is a silica glass member having a distribution of signed birefringence values, which monotonously increase from a center to a peripheral portion of the plane, the silica glass member being obtained by a manufacturing method comprising:

a fourth step of heating a silica glass ingot to a predetermined temperature;

a fifth step of cooling the silica glass ingot with a temperature distribution in at least one plane perpendicular to a rotational axis of the silica glass ingot, the temperature distribution being rotationally symmetrical with respect to the center of the plane and having a maximal value between the center and the peripheral portion of the plane; and a sixth step of obtaining a distribution of signed birefringence values on the basis of birefringence values and directions of phase advance axes measured at a plurality of points in the plane perpendicular to the rotational axis of the silica glass ingot and cutting, from the silica glass ingot, a silica glass member whose signed birefringence values monotonously increase from the center to the peripheral portion of the plane.

According to the present invention, control is performed in the silica glass member manufacturing process such that the silica glass ingot has the specific temperature distribution, the distribution of signed birefringence values is obtained on the basis of birefringence values and their directions of phase advance axes measured at a plurality of points in a predetermined plane of the resultant silica glass ingot, and a silica glass member whose distribution of signed birefringence values monotonously increase from the plane center to the peripheral portion is cut, thereby efficiently and properly obtaining a silica glass member having a distribution of birefringence values, in which the birefringence values monotonously increase from the plane center to the peripheral portion. When the silica glass member of the present invention obtained in the above way and a conventional silica glass member having a distribution of signed birefringence values, in which the signed birefringence values monotonously decrease from the plane center to the peripheral portion are used, the birefringence values are sufficiently uniformed while realizing high transmittance and highly uniform refractive index in the entire optical system. Hence, a sufficiently high resolution can be obtained in the imaging optical system of a projection exposure apparatus.

The concept of a signed birefringence value according to the present invention will be described here.

A signed birefringence value means a birefringence value to which a sign is given in consideration of the direction of phase advance axis defined in an index ellipsoid in obtaining the birefringence value of an optical member.

More specifically, in a plane which is centered on the intersection to the optical axis of an optical member and is perpendicular to the optical axis, a region circularly irradiated with a light beam is defined as an almost circular effective cross-section. When the direction of phase advance axis in a small region at a birefringence measuring point on this effective cross-section is parallel to the radiation direction from the center as the intersection to the optical axis of the optical member, the plus sign is given to the measured birefringence value. When the direction of phase advance axis is perpendicular to the radiation direction, the minus sign is given to the measured birefringence value.

The manner a sign is given to a birefringence value is also applicable when the plane which is centered on the intersection to the optical axis of the optical member and is perpendicular to the optical axis is irradiated with a plurality of light beams. In this case as well, when the radiation direction from the center as the intersection to the optical axis of the optical member is parallel to the direction of phase advance axis in a small region at a birefringence measuring point on an effective cross-section irradiated with each of the plurality of light beams, the plus sign is given to the measured birefringence value. When the direction of phase advance axis is perpendicular to the radiation direction, the minus sign is given to the measured birefringence value.

The manner a sign is given to a birefringence value is also applicable when the plane which is centered on the intersection to the optical axis of the optical member and is perpendicular to the optical axis is irradiated with a light beam having a sectional shape other than a circular sectional shape, e.g., a light beam having a ring-shaped cross-section or elliptical cross-section. In this case as well, when the radiation direction from the center as the intersection to the optical axis of the optical member is parallel to the direction of phase advance axis in a small region at a birefringence measuring point on an effective cross-section irradiated with each of the plurality of light beams, the plus sign is given to the measured birefringence value. When the direction of phase advance axis is perpendicular to the radiation direction, the minus sign is given to the measured birefringence value.

In the following description, a case wherein the plus sign is given to a birefringence value measured when the direction of phase advance axis in a small region at a birefringence measuring point on the effective cross-section irradiated with a light beam is parallel to the radiation direction from the center as a the intersection to the optical axis of the optical member, and the minus sign is given to a birefringence value measured when the direction of phase advance axis is perpendicular to the radiation direction will be described.

The signed birefringence value will be described below in more detail with reference to FIGS. 1A, 1B, 2A, 2B, 3A, and 3B.

FIG. 1A is a schematic diagram to show the directions of phase advance axes at birefringence measuring points $P_{11}$, $P_{12}$, $P_{13}$, and $P_{14}$ separated from a center O on the effective cross-section of an optical member L1 by distances $r_1$, $r_2$, $r_3$, and $r_4$, respectively. Referring to FIG. 1A, the birefringence measuring points $P_{11}$ to $P_{14}$ are set on a line $Q_1$ radially extending through the center $O_1$, for the descriptive convenience. The size of a small region represented by a circle at each measuring point corresponds to the optical path difference at the measuring point. Line segments $W_{11}$, $W_{12}$, $W_{13}$, and $W_{14}$ in these small regions represent the directions of phase advance axes. Since the directions of phase advance axes at all the measuring points $P_{11}$ to $P_{14}$ are parallel to the direction of line $Q_1$, i.e., the radial direction, all the birefringence values at the measuring points $P_{11}$ to $P_{14}$ are expressed with the plus sign. The radial distribution of signed birefringence values $A_{11}$, $A_{12}$, $A_{13}$, and $A_{14}$ at the measuring points $P_{11}$ to $P_{14}$ shown in FIG. 1A, which are obtained in the above way, has a profile shown in, e.g., FIG. 1B.

FIG. 2A is a schematic diagram to show the directions of phase advance axes at birefringence measuring points $P_{21}$, $P_{22}$, $P_{23}$, and $P_{24}$ separated from a center $O_2$ on the effective cross-section of an optical member L2 by the distances $r_1$, $r_2$, $r_3$, and $r_4$, respectively, like FIG. 1A. In this case, since the directions of phase advance axes $W_{21}$, $W_{22}$, $W_{23}$, and $W_{24}$ at all the measuring points $P_{21}$ to $P_{24}$ are perpendicular to the direction of line $Q_2$, i.e., the radial direction, all signed birefringence values $A_{21}$, $A_{22}$, $A_{23}$, and $A_{24}$ at the measuring points $P_{21}$ to $P_{24}$ are expressed with the minus sign. The radial distribution of the signed birefringence values $A_{21}$ to $A_{24}$ at the measuring points $P_{21}$ to $P_{24}$ shown in FIG. 2A, which are obtained in the above way, has a profile shown in, e.g., FIG. 2B.

FIG. 3B is a schematic diagram to show the directions of phase advance axes at birefringence measuring points $P_{31}$, $P_{32}$, $P_{33}$, and $P_{34}$ separated from the center O on the effective cross-section of an optical member L2 by the distances $r_1$, $r_2$, $r_3$, $r_4$, and $r_5$ respectively, like FIG. 1A. In this case, as for the directions of phase advance axes $W_{31}$, $W_{32}$, $W_{33}$, $W_{34}$, and $W_{35}$ at the measuring points $P_{11}$ to $P_{14}$, since the directions of phase advance axes are parallel to the direction of line $Q_3$, i.e., the radial direction at the measuring points $P_{31}$ to $P_{33}$ and perpendicular to the radial direction at the measuring points $P_{33}$ and $P_{34}$, the radial distribution of signed birefringence values $A_{31}$ to $A_{35}$ obtained at the measuring points $P_{31}$ to $P_{35}$ has a profile as shown in FIG. 3B.

BRIEF DESCRIPTION OF THE DRAWINGS

FIGS. 10A and 10B are explanatory diagrams to show an example of the arrangement of an illumination optical system of the projection exposure apparatus shown in FIG. 9;

BEST MODE OF CARRYING OUT THE INVENTION

First, the first method of manufacturing silica glass of the present invention will be described.

Figure 4:
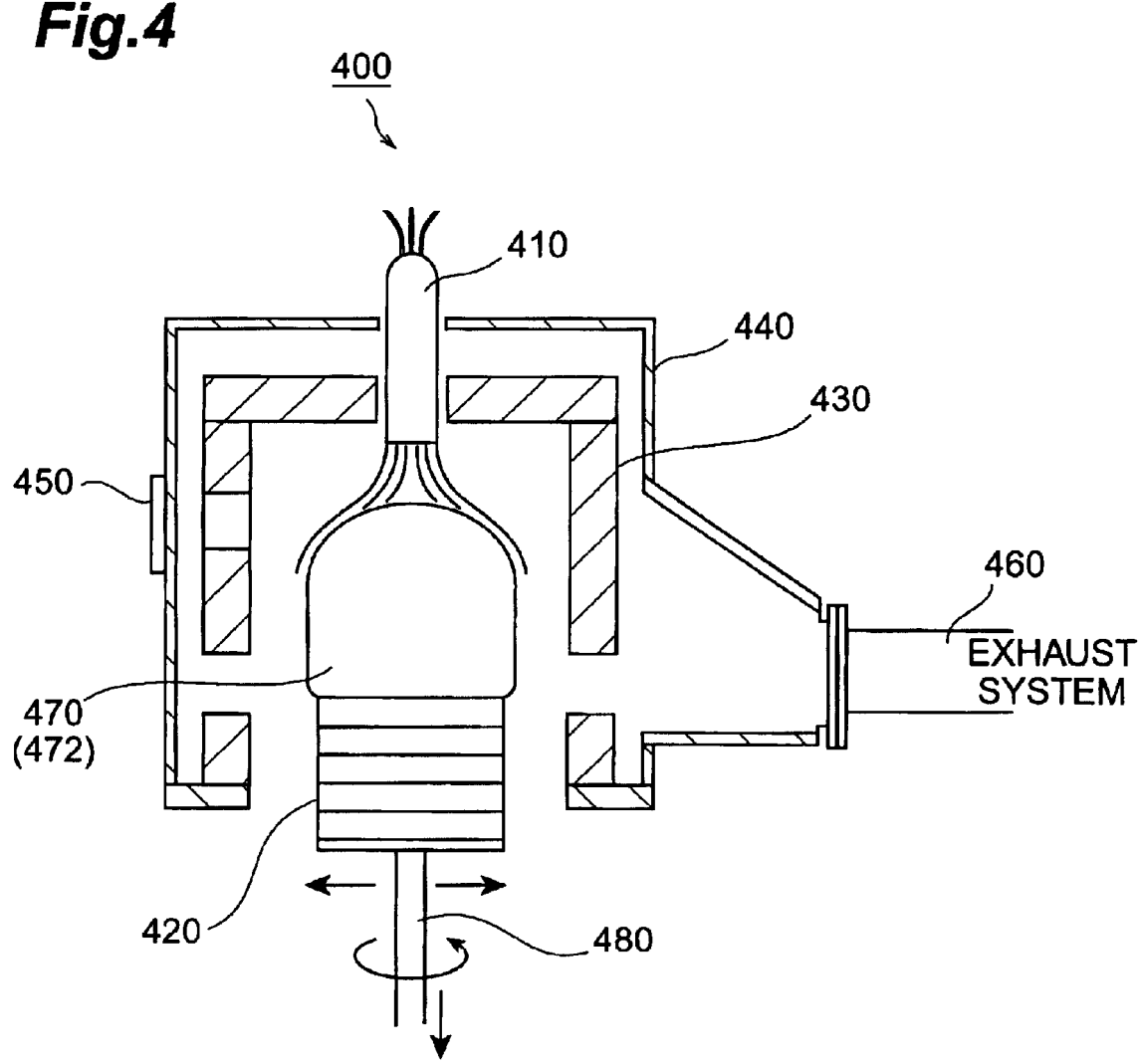
FIG. 4 is an explanatory diagram to show an example of a silica glass ingot synthesizing furnace used in the present invention.

FIG. 4 is an explanatory diagram to show an example of a furnace for synthesis of a silica glass ingot used in the first method of manufacturing silica glass of the present invention. Referring to FIG. 4, a silica glass burner 410 having a multi-tubular structure is set from the upper portion of a synthesizing furnace 400 while having its distal end directed to a target 420. The furnace wall is constituted by a furnace frame 440 and refractory 430 and has an observation window (not shown), IR camera monitor window 450, and exhaust system 460. The target 420 for silica glass ingot formation is placed at the lower portion of the synthesizing furnace 400. The target 420 is connected to an X-Y stage (not shown) outside the furnace through a support shaft 480. The support shaft 480 can be rotated by a motor. The X-Y stage can be two-dimensionally moved in the X-axis direction and Y-axis direction by X-axis servo motor and Y-axis servo motor.

In the first manufacturing method of the present invention, first, an oxygen containing gas and hydrogen-containing gas are injected from the burner 410 and mixed to form an oxyhydrogen flame. When a silicon compound as a material is diluted by a carrier gas and injected from the central portion of the burner 410 into the flame, fine silica glass particles (soot) are generated by hydrolyzing the silicon compound. As a silicon compound used in the present invention, an organosilicon compound, e.g., a silicon chloride such as $SiCl_4$ or $SiHCl_3$, a silicon fluoride such as $SiF_4$ or $Si_2F_6$, a siloxane such as hexamethyldisiloxane, octamethylcyclotetrasiloxane, or tetramethylcyclotetrasiloxane, or a silane such as methyltrimethoxysilane, tetraethoxysilane, or tetramethoxysilane, or other silicon compound such as $SiH_4$ or $Si_2H_6$ can be used.

When the fine silica glass particles obtained in the above process are deposited on the target 420 that is rotating and oscillating and also melted/vitrified, a transparent silica glass ingot is obtained. At this time, the upper portion of the ingot is covered with the flame. The temperature of the silica glass ingot formed on the target 420 is controlled on the basis of the observation result by an IR camera (not shown) to obtain a temperature distribution which is symmetrical with respect to the rotational axis in a plane perpendicular to the rotational axis and has a maximal value between the center and the peripheral portion of the plane. The target 420 is pulled down in the Z direction such that the position of the synthetic surface at the upper portion of the ingot is always kept equidistant from the burner.

Figure 5:
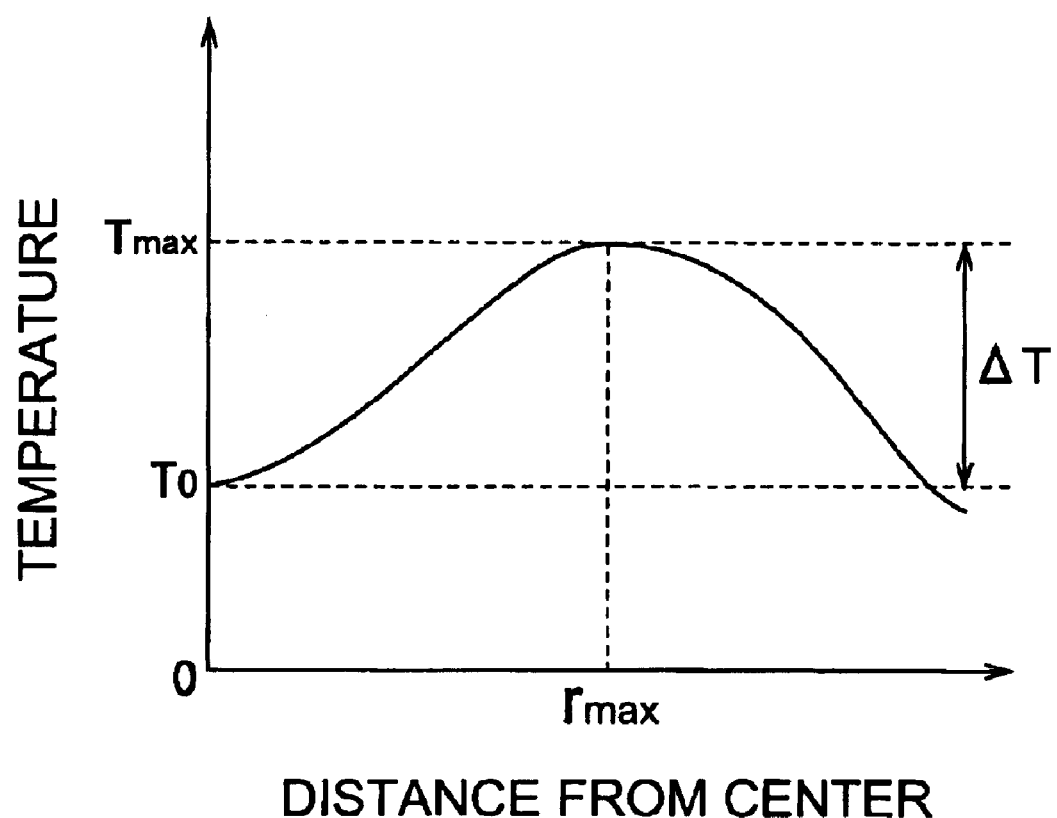
FIG. 5 is a graph to show the correlation between the temperature and the distance from the center in a plane perpendicular to the rotational axis of a silica glass ingot in the first manufacturing method of the present invention.

More specifically, the silica glass ingot formed on the target 420 in the above process has a temperature distribution shown in FIG. 5 from the center of the plane perpendicular to the rotational axis in the direction of radius r. When the temperature distribution of the silica glass ingot is controlled in this manner, and also a member is cut on the basis of the distribution of signed birefringence values (to be described later), a silica glass member having a distribution of signed birefringence values, in which the signed birefringence values monotonously radially increase from the center, can be obtained for the first time. The present inventors suppose that in the conventional direct method, the peripheral portion of a silica glass ingot is abruptly cooled to increase the density while the central portion is kept hot and becomes coarse unlike the peripheral portion, so the obtained silica glass ingot exhibits a distribution of signed birefringence values, in which the signed birefringence values monotonously radially decreases from the center.

Referring to FIG. 5, when To represents the temperature at the center (r=0) of the plane perpendicular to the rotational axis of the silica glass ingot formed on the target 420 and $T_{max}$ represents the maximal point of temperature at $r=r_{max}$, it is preferable that the temperature difference $\Delta T=T_{max}-T_0$ exceeds 0° C. and is not more than 200° C. When $\Delta T$ exceeds 200° C., distortion in the resultant silica glass ingot tends to be large.

Figure 3A:
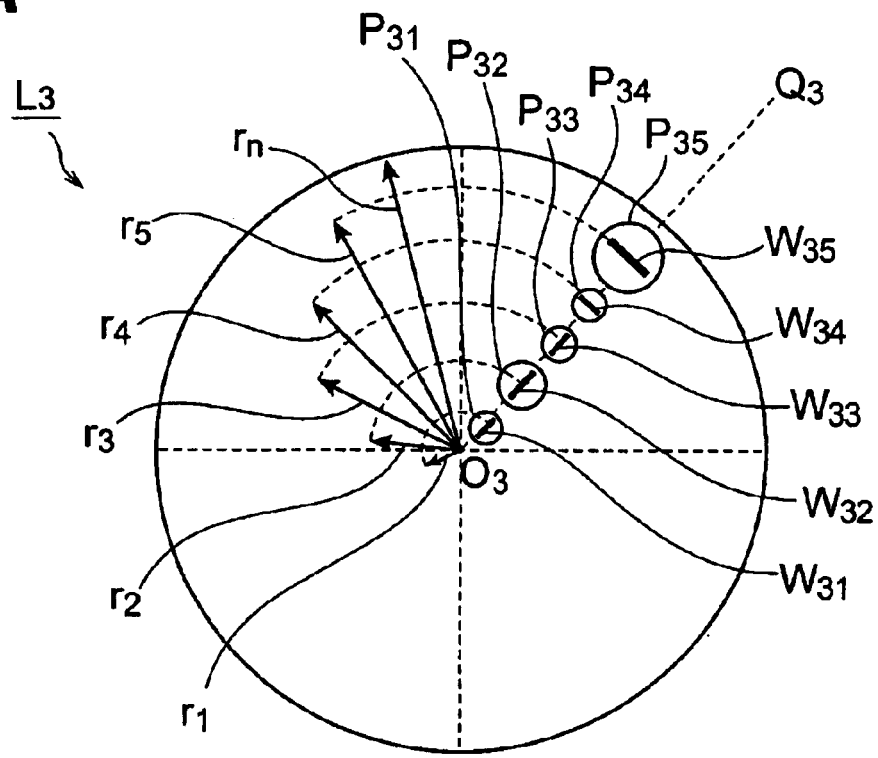
FIG. 3A is still another explanatory diagram to show the concept of a signed birefringence value.
Figure 3B:
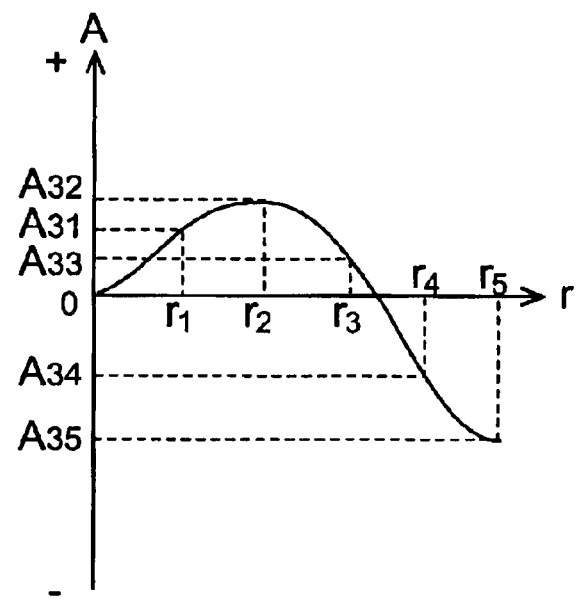
FIG. 3B is a graph to show the distribution of signed birefringence values in the optical member shown in FIG. 3A.

When birefringence values and their phase advance axis directions are measured at a plurality of points in the plane perpendicular to the rotational axis of a silica glass ingot obtained in the above way, normally, correlations as shown in FIG. 3B are observed between the distances r from the center and signed birefringence values A. As a birefringence value measuring method according to the present invention, a phase modulation method, a rotary analyzer method, or a phase compensation method can be used.

In the phase modulation method, an optical system is constituted by a light source, polarizer, phase modulation element, sample, and analyzer. As the light source, an He—Ne laser or laser diode is used. As the phase modulation element, a photoelastic converter is used. Light from the light source is converted into linearly polarized light by the polarizer and becomes incident on the phase modulation element. The light beam from the phase modulation element, which is projected onto the sample, is modulated light whose polarized state is continuously changed by the elements as linearly polarized light→circularly polarized light→linearly polarized light. In the measurement, the peak of the output from the detector is found by rotating the sample about the light beam incident on the measuring point on the sample, and the amplitude at that time is measured, thereby obtaining the direction of phase advance axis and the magnitude of the birefringence phase difference. Note that the measurement can be done without rotating the sample when a zeeman laser is used as the light source. In the present invention, a phase shift method or optical heterodyne interferometry can also be used.

In the rotary analyzer method, an apparatus is designed to sandwich a sample between a light source and a photodetector by a polarizer and a rotary analyzer. A signal from the detector is measured while rotating the analyzer placed behind the sample, and the phase difference is obtained from the maximum and minimum values of the signal for the detector.

In the phase compensation method, a light source, polarizer, sample, phase compensator, analyzer, and photodetector are arranged. The polarizer and the analyzer are placed such that their axes become perpendicular to each other. Linearly polarized light incident on the sample is converted into elliptically polarized light by birefringence in the sample. When the phase compensator is adjusted, the light becomes linearly polarized light again, so the signal at the photodetector can be substantially nullified. A phase compensation value obtained for the best extinction corresponds to the amount of birefringence.

When the thickness of the sample is sufficient, a birefringence value can be obtained even by a simple method of comparing a measured sample with a standard sample, which are placed in a crossed Nicols optical system.

As described above, the + (plus) sign is given to the measured birefringence value when the direction of phase advance axis is parallel to the radial direction of the member, and the − (minus) sign is given to the measured value when the direction of phase advance axis is perpendicular to the radial direction of the member. When the measured birefringence value is small, the phase advance axis is not always completely parallel or perpendicular to the radial direction of the member and may have a inclination. When the angle of phase advance axis with respect to the radial direction is smaller than 45°, the plus sign is given to the birefringence value. When the angle is larger than 45°, the minus sign is given to the birefringence value.

When a predetermined portion between the center (r=0) and $r=r_2$ that gives a maximal value $A_{32}$ is cut on the basis of the distribution of signed birefringence values obtained in the above way, a silica glass member having a distribution of signed birefringence values, in which the signed birefringence values monotonously increase for the center to the peripheral portion of the plane, is obtained. The silica glass member of the present invention, which is obtained in the above way, is excellent in rotational symmetry in the birefringence value distribution, and wavefront aberration caused by the index distribution can be easily corrected by the optical design. In obtaining such a silica glass member, the geometric center of the silica glass member and the center of the ingot must match in the cut process. In addition, the silica glass member obtained by the first method of the present invention includes no ingot peripheral portion at which the temperature distribution or internal atmosphere in the furnace readily becomes unstable. For this reason, the concentration of an impurity such as OH or Cl is sufficiently low, and higher optical characteristics can be obtained.

In the above first manufacturing method of the present invention, the obtained silica glass ingot or silica glass member may be annealed. More specifically, annealing means a process of heating an optical element or optical member to a temperature (normally 1,000° C. to 1,200° C.) near the annealing point, held for a predetermined time, and cooled at a predetermined cooling rate. With such a process, the transmittance or refractive index of the optical member can be made uniform.

In the first manufacturing method of the present invention, the silica glass ingot or silica glass member is preferably not subjected to high-temperature heat treatment. In the conventional manufacturing method, when the refractive index is conspicuously uneven, e.g., striae are observed in ten obtained silica glass ingot, high-temperature heat treatment is performed at a temperature higher than the diversifying temperature range of silica glass, at which silica glass softens and deforms (normally 1,600° C. or more). However, when such high-temperature heat treatment is performed for the silica glass ingot or silica glass member obtained by the first manufacturing method of the present invention, the silica glass ingot or silica glass member is cooled from the peripheral portion in the cooling process, and a distribution of signed birefringence values, in which the signed birefringence values monotonously radially decrease from the center, is observed, so a desired silica glass member tends not to be obtained. Note that a distribution of signed birefringence values, in which the signed birefringence values monotonously radially increase from the center, is given by the second manufacturing method of the present invention to the silica glass member obtained by the conventional manufacturing method including the high-temperature heat treatment.

The second silica glass member manufacturing method of the present invention will be described next.

Figure 6:
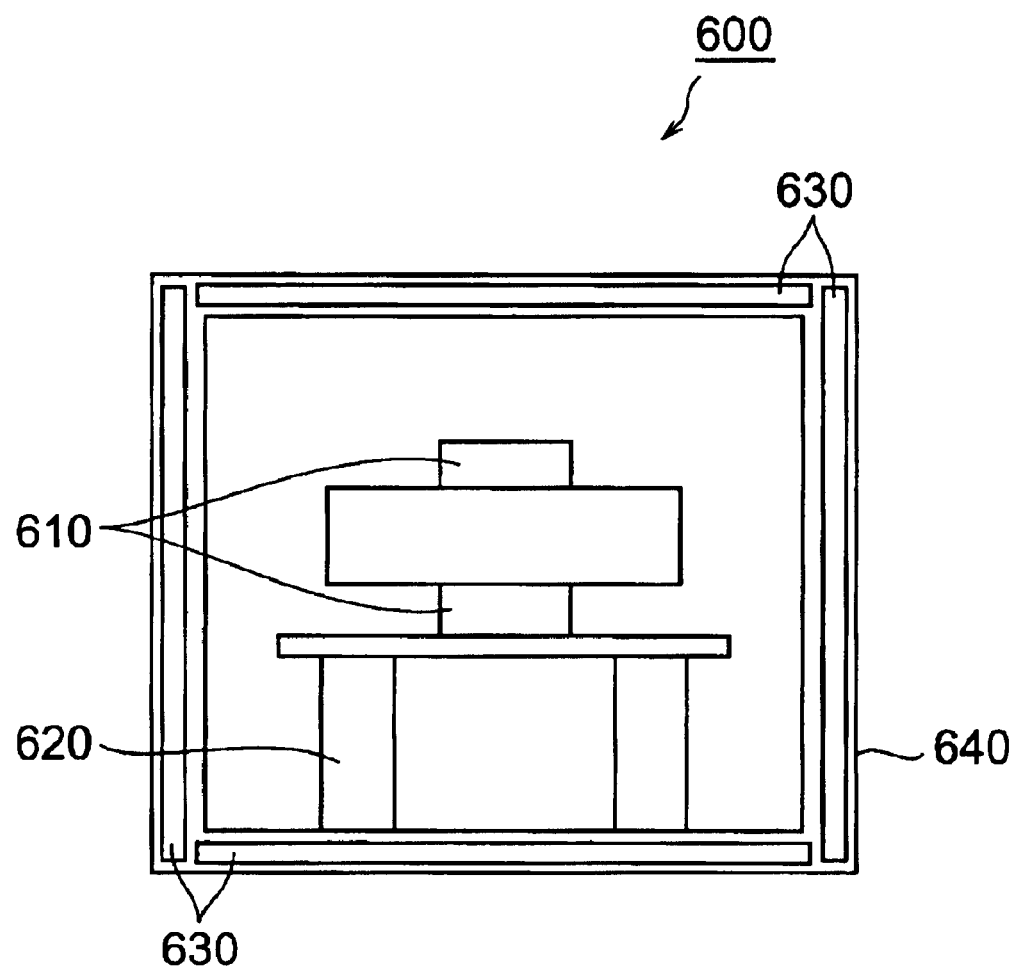
FIG. 6 is an explanatory diagram to show an example of a heat treatment apparatus used in the present invention.

FIG. 6 is an explanatory diagram to show an example of a heat treatment apparatus used in the second manufacturing method of the present invention. Referring to FIG. 6, a heat treatment apparatus 600 has a pair of ceramic plates 610, 610 arranged on a sample table 620. A silica glass ingot as a sample can be placed between the ceramic plates 610, 610. The ceramic plates 610, 610 and sample table 620 are accommodated in a furnace wall 640 having heaters 630. The ceramic plates 610, 610 and heaters 630 are electrically connected to a controller (not shown). A control signal for controlling the temperature of the ceramic plates 610, 610 or heater 630 is sent from the controller. In the heat treatment apparatus 600, the temperature distribution of the silica glass ingot can be observed with an IR camera. In the present invention, the atmosphere in the heat treatment apparatus 600 is preferably inert gas atmosphere, air atmosphere, or hydrogen atmosphere. Especially, it is preferable to execute processes to be described later in the hydrogen atmosphere because hydrogen molecules in silica glass are hardly emitted.

Figure 2A:
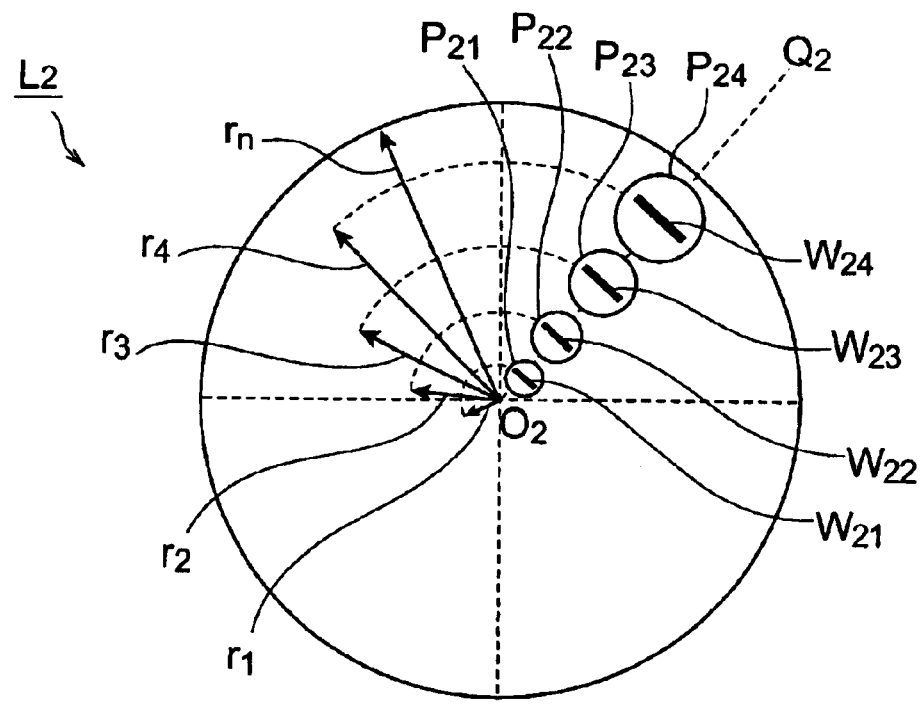
FIG. 2A is another explanatory diagram to show the concept of a signed birefringence value.
Figure 2B:
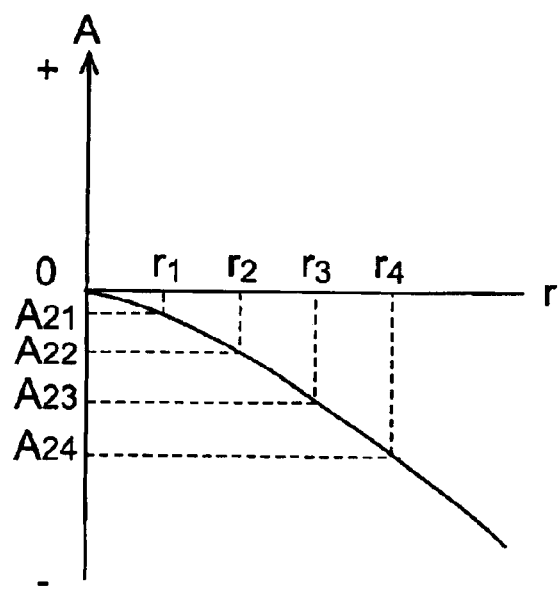
FIG. 2B is a graph to show the distribution of signed birefringence values in the optical member shown in FIG. 2A.

In the second manufacturing method of the present invention, first a cylindrical silica glass ingot is placed between the ceramic plates 610, 610, and the atmospheric temperature in the heat treatment apparatus 600 is raised to heat the silica glass ingot. The silica glass ingot used in the second manufacturing method of the present invention may be either one obtained by the first manufacturing method of the present invention or one obtained by a conventionally known method. As a conventionally known silica glass manufacturing method, for example, a) a method of obtaining fine glass particles (soot) by hydrolyzing a silicon compound in an oxyhydrogen flame, forming porous glass (soot body) by depositing the glass particles, and vitrifying the porous glass at a temperature equal to or higher than the softening point (preferably, melting point), thereby obtaining transparent silica glass, or b) a method of hydrolyzing a silicon compound in an oxyhydrogen flame, depositing resultant fine glass particles on a target, and simultaneously vitrifying the glass particles, thereby obtaining transparent silica glass can be used. The method a is called a soot method, and the method b is called a direct method. As a porous glass forming method in the soot method, VAD method, OVD method, or sol-gel method can be used. The silica glass ingot obtained by the above conventional method normally has a birefringence value distribution as shown in FIG. 2B.

The heated silica glass ingot is held at a predetermined temperature (preferably, 1,600° C. to 2,000° C.) for a predetermined time (preferably 1 to 100 hrs). The silica glass ingot is cooled while controlling the temperatures of the ceramic plates 610, 610 and heaters 630 such that the temperature of the ceramic plates 610, 610 always becomes lower than the atmospheric temperature in the heat treatment apparatus 600, i.e., the silica glass ingot has the distribution shown in FIG. 5. The difference between the atmospheric temperature in the heat treatment apparatus 600 and the temperature of the ceramic plates 610, 610 is preferably 20° C. to 300° C. When the temperature difference is smaller than the lower limit value, a silica glass member having a birefringence value with a positive sign tends not to be obtained. On the other hand, when the temperature difference exceeds the upper limit value, the difference between the maximum value and the minimum value of the signed birefringence values in the resultant member tends to increase to cause inhomogeneity. The cooling rate in the cooling process is preferably 1° C./hr to 50° C./hr. If the cooling rate is less than the lower limit value, the operation efficiency tends to decrease. On the other hand, if the cooling rate exceeds the upper limit value, the resultant silica glass member tends to be inhomogeneous. It is also preferable to naturally cool the silica glass ingot after it is cooled from the predetermined holding temperature to 500° C. in the cooling process because the process can be simplified while excluding factors that affect the distribution of signed birefringence values. The area of the ceramic plane which comes into contact with the silica glass ingot is appropriately selected in accordance with the diameter of the desired silica glass member. The distance between the peripheral portion of the silica glass ingot and that of the ceramic plate is preferably 20 mm or more. When the distance between the peripheral portion of the silica glass ingot and that of the ceramic plate is 20 mm or less, the ceramic plate contact portion and the peripheral portion of the silica glass ingot have no temperature difference therebetween, and a silica glass member whose signed birefringence values monotonously radially increase from the center tends not to be obtained.

Figure 1A:
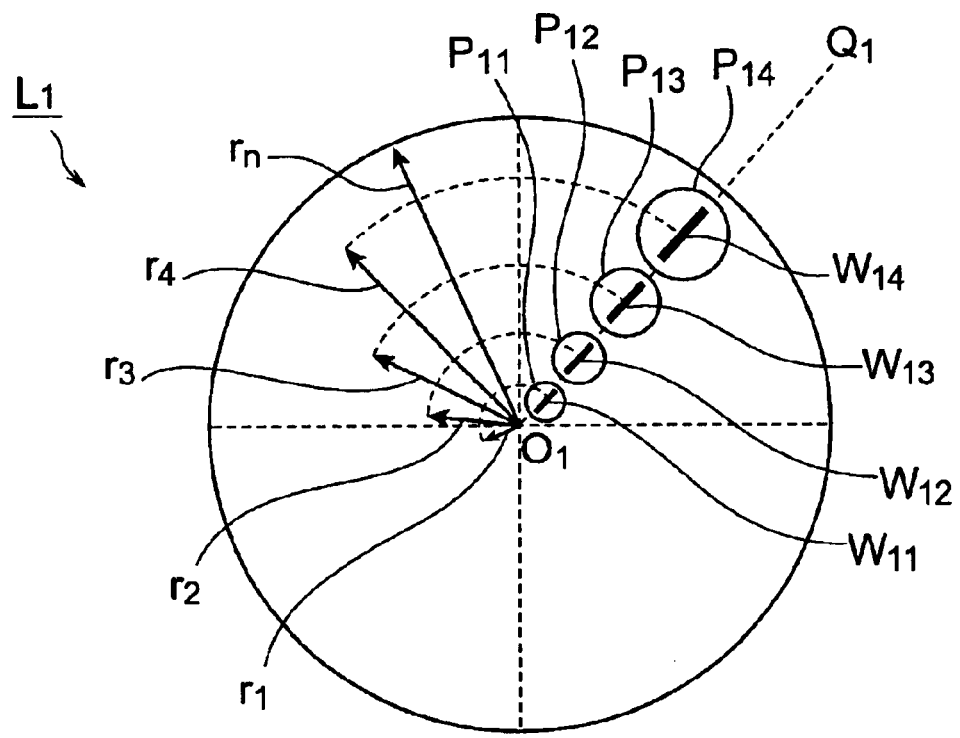
FIG. 1A is an explanatory diagram to show the concept of a signed birefringence value.
Figure 1B:
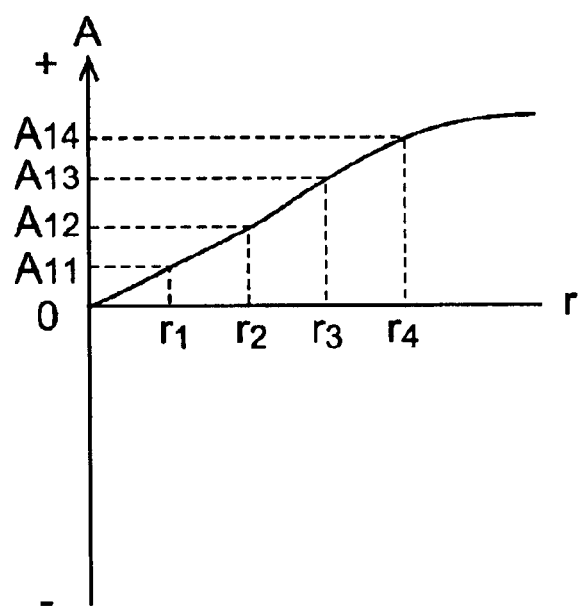
FIG. 1B is a graph to show the distribution of signed birefringence values in the optical member shown in FIG. 1A.

When birefringence values and their directions of phase advance axes are measured at a plurality of points to the silica glass ingot after the cooling process, normally, a correlation shown in FIG. 1B is obtained between the distances r from the center and the signed birefringence values. As a method of measuring a signed birefringence value, the method of measuring a signed birefringence value, which is exemplified in the description of the first manufacturing method of the present invention, can be used.

In the present invention, it is particularly preferable to combine the first and second manufacturing methods of the present invention. More specifically, the silica glass ingot obtained by the first manufacturing method of the present invention already has a distribution of signed birefringence values, in which the signed birefringence values (FIG. 3B) which monotonously radially increase from the center. When the heat treatment process and cooling process included in the second manufacturing method of the present invention are performed, the difference between the maximum value and the minimum value of the signed birefringence values becomes small to make the refractive index more uniform. When a predetermined portion is cut on the basis of the distribution of signed birefringence values, a silica glass member having a distribution of signed birefringence values, in which the signed birefringence values monotonously increase from the center to the peripheral portion of the plane, can be obtained. The silica glass member of the present invention, which is obtained in the above way, is excellent in rotational symmetry in the birefringence value, and wavefront aberration caused by the index distribution can be easily corrected by the optical design. In obtaining such a silica glass member, the geometric center of the silica glass member and the center of the ingot must match in the cut process.

FIG. 6 shows the heat treatment apparatus 600 having the ceramic plates 620. In the present invention, the silica glass ingot can also be cooled by injecting an inert gas at a lower temperature than the atmospheric temperature to the central portion of the silica glass ingot such that the central portion and peripheral portion of the silica glass ingot hold a predetermined temperature difference. As the inert gas used in the present invention, dry air, nitrogen gas, or hydrogen gas can be used. The temperature of the inert gas is preferably 0° C. to 300° C., and its dew point is preferably −50° C. or less.

In the first and second manufacturing methods of the present invention, the silica glass member after the process such as the cut process is subjected to a process such as heat treatment for rapid heating→holding for short time→rapid cooling, hydrofluoric acid treatment, or centering, as needed. With such a process, the variation between the signed birefringence values, which is inherent to the silica glass member, or process distortion caused by the cut process or the like tends to be suppressed. In centering, the side surface (outer surface) of the silica glass member is preferably ground by about 0.1 mm at a speed not to cause process distortion.

The optical member of the present invention, which is obtained in the above manner, has a distribution of signed birefringence values, which is symmetrical with respect to the geometric center and in which the sugned birefringence values monotonously radially increase from the center. When an optical system is manufactured using the silica glass member of the present invention and a conventional optical member having a distribution of signed birefringence values, which is symmetrical with respect to the geometric center and in which signed birefringence values monotonously radially decrease from the center while estimating the signed birefringence characteristic value of the entire optical system from the respective signed birefringence values such that the birefringence value distributions cancel each other, satisfactory imaging performance can be obtained.

The concept of the signed birefringence characteristic value of the entire optical system according to the present invention will be described here on the basis of FIGS. 7A and 7B.

Figure 7A:
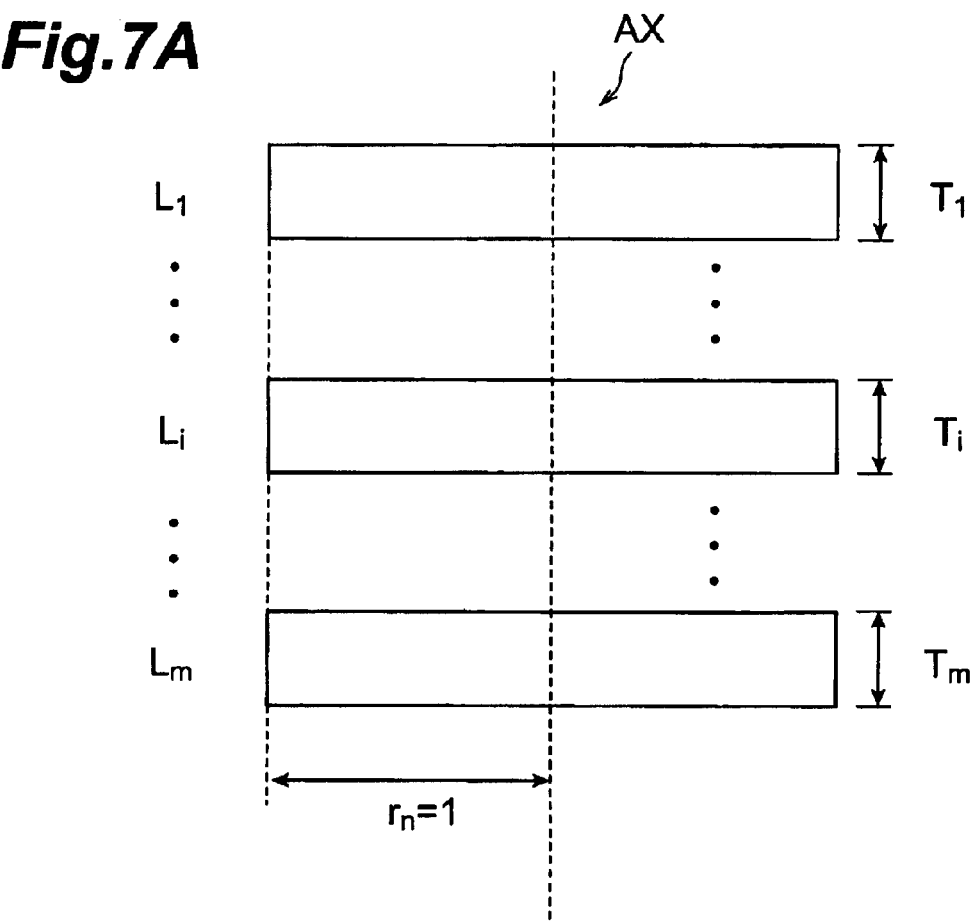
FIG. 7A is a side view to show a plurality of optical members of a projection optical system.

FIG. 7A is a schematic side view in which m optical members of a projection optical system are sequentially laid out from the light source. FIG. 7B is a schematic sectional view to show an effective cross-section perpendicular to the optical axis of an optical member $L_i$ placed at the ith position from the light source in the m optical members shown in FIG. 7A.

In the present invention, assume that the birefringence value distribution in the optical member is uniform in the direction of member thickness parallel to the optical axis and nonuniform in the radial direction on the effective cross-section perpendicular to the optical axis. The effective cross-section means a region irradiated with a light beam in the plane perpendicular to the optical axis of the optical member. The intersection to the optical axis is defined as the center of the effective cross-section, and the radius is defined as the effective radius of the effective cross-section of the optical member. In measuring the signed birefringence characteristic value of the entire projection optical system, since the size of the effective cross-section changes in optical members, the sizes of the effective cross-sections of all optical members are normalized in advance such that a maximum effective radius $r_n$ of each optical member becomes 1, as shown in FIG. 7A.

When the plane which is centered on the intersection to the optical axis of the optical member and is perpendicular to the optical axis is irradiated with a plurality of light beams, the sizes of the effective cross-sections of all optical members are normalized in advance such that the maximum effective radius $r_n$ of each optical member becomes 1 for effective cross-sections corresponding to the individual light beams.

In addition, when the plane which is centered on the intersection to the optical axis of the optical member and is perpendicular to the optical axis is irradiated with a light beam having a sectional shape other than a circular sectional shape, e.g., a light beam having a ring-shaped cross-section or elliptical cross-section, the sizes of the effective cross-sections of all optical members are normalized in advance such that the maximum effective radius $r_n$ of each optical member becomes 1 for effective cross-sections corresponding to the individual light beams.

For example, when the plane is irradiated with a light beam having a ring-shaped cross-section, the sizes of the effective cross-sections of all optical members are normalized in advance such that the maximum outer diameter of the ring becomes 1. Measurement of a signed birefringence value is done in the same way as for measurement for a light beam having a circular sectional shape (to be described below). When the plane is irradiated with a light beam having an elliptical cross-section, the sizes of the effective cross-sections of all optical members are normalized in advance such that the maximum outer diameter of the major axis of the ellipse becomes 1. Measurement of a signed birefringence value is done in the same way as for measurement for a light beam having a circular sectional shape (to be described below).

Figure 7B:
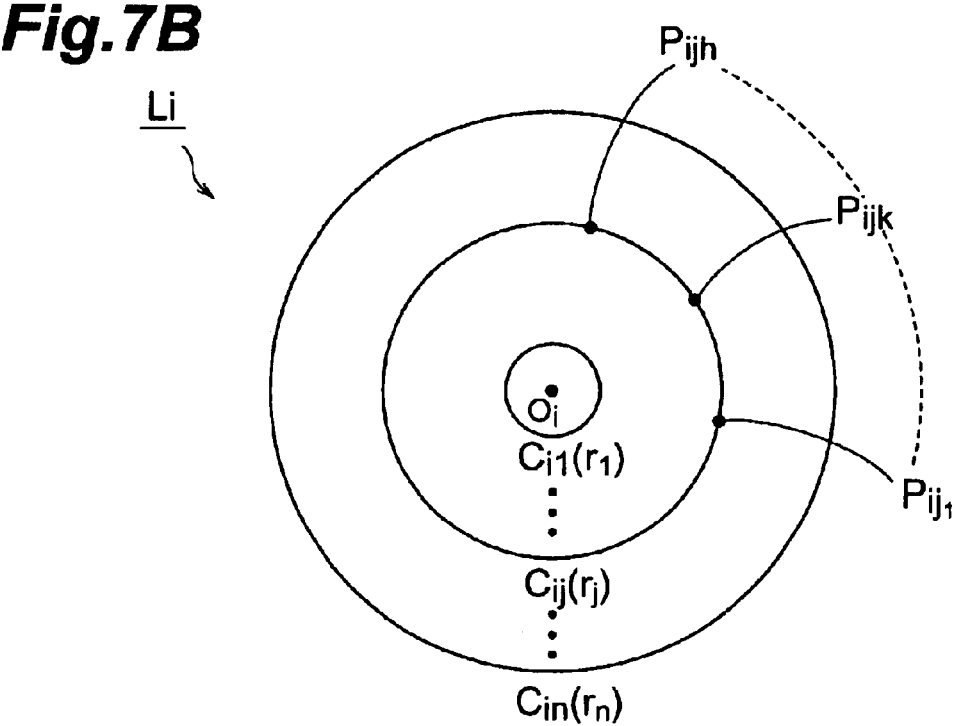
FIG. 7B is a sectional view of the optical member of the projection optical system.

To measure the signed birefringence characteristic value of the entire projection optical system, first, a model of a plurality of concentric circles $C_{ij}$ which have a center $O_i$ and different radii from the center is assumed on the effective cross-section of one optical member $L_i$ first, as shown in FIG. 7B. Next, the birefringence value at a kth measuring point $P_{ijk}$ on the jth concentric circle $C_{ij}$ having a radius $r_j$ from the center $O_i$ is measured. A sign is given to the birefringence value in consideration of the relationship between the phase advance axis direction and the radial direction at the measuring point $P_{ijk}$ to define a signed birefringence value $A_{ijk}$ at the measuring point $P_{ijk}$.

In this case, i represents the number (i=1, 2, . . . , m; 2≦m) of an optical member L of the projection optical system, j represents the number (j=1, 2, . . . , n; 1≦n) of each of concentric circles C centered on the optical axis and having different radii from the optical axis, which are assumed on the effective cross-section perpendicular to the optical axis of the optical member L, and k represents the number (k=1, 2, . . . , h; 1≦h) of a measuring point on the circumference of the concentric circle C. In this way, signed birefringence values $A_{ij1}$ to $A_{ijh}$ at predetermined measuring points $P_{ij1}$ to $P_{ijh}$ on the single concentric circle $C_{ij}$ are measured.

An average signed birefringence value $B_{ij}$ as the arithmetic mean of the signed birefringence values at the measuring points on the circumference of the concentric circle $C_{ij}$ in the optical member $L_i$ is calculated in accordance with $$B_{ij} = \frac{\sum_{k=1}^{b} A_{ijk}}{h} \quad (1)$$

Next, an average signed birefringence amount $E_{ij}$ as the product of the average signed birefringence value $B_{ij}$ and an apparent thickness $T_i$ is calculated in accordance with $$E_{ij} = B_{ij} \times T_i \quad (2)$$

where $T_i$ is the apparent thickness of the optical member $L_i$. As this apparent thickness, one of the average value of thicknesses in the effective cross-section of the optical member $L_i$ and the effective thickness by matching with another member combined to the upper or lower position of the optical member $L_i$ in the layout in the optical system is appropriately selected.

Next, an average change amount $G_j$ of the signed birefringence values, which is obtained by dividing the sum of the average signed birefringence amounts $E_{ij}$ in the entire projection optical system by a total optical path length D, is calculated in accordance with $$G_j = \frac{\sum_{i=1}^{m} E_{ij}}{D} \quad (3)$$

where D is the apparent total optical path length of the entire projection optical system, which is given by $$D = \sum_{i=1}^{m} T_i \quad (4)$$

Next, a signed birefringence characteristic value H of the entire projection optical system, which is obtained by dividing the sum of the average change amounts $G_j$ of the signed birefringence values in the entire projection optical system by the number n of concentric circles, is calculated in accordance with $$H = \frac{\sum_{j=1}^{n} G_j}{n} \quad (5)$$

In the present invention, when the signed birefringence characteristic value H of the entire optical system, which is obtained according to the above procedure, satisfies $$-0.5 \leq H \leq +0.5 \text{ nm/cm} \quad (6)$$

it is preferable because the entire projection optical system exhibits excellent imaging performance, and the projection exposure apparatus having this projection optical system tends to exhibit a high resolution.

Figure 8:
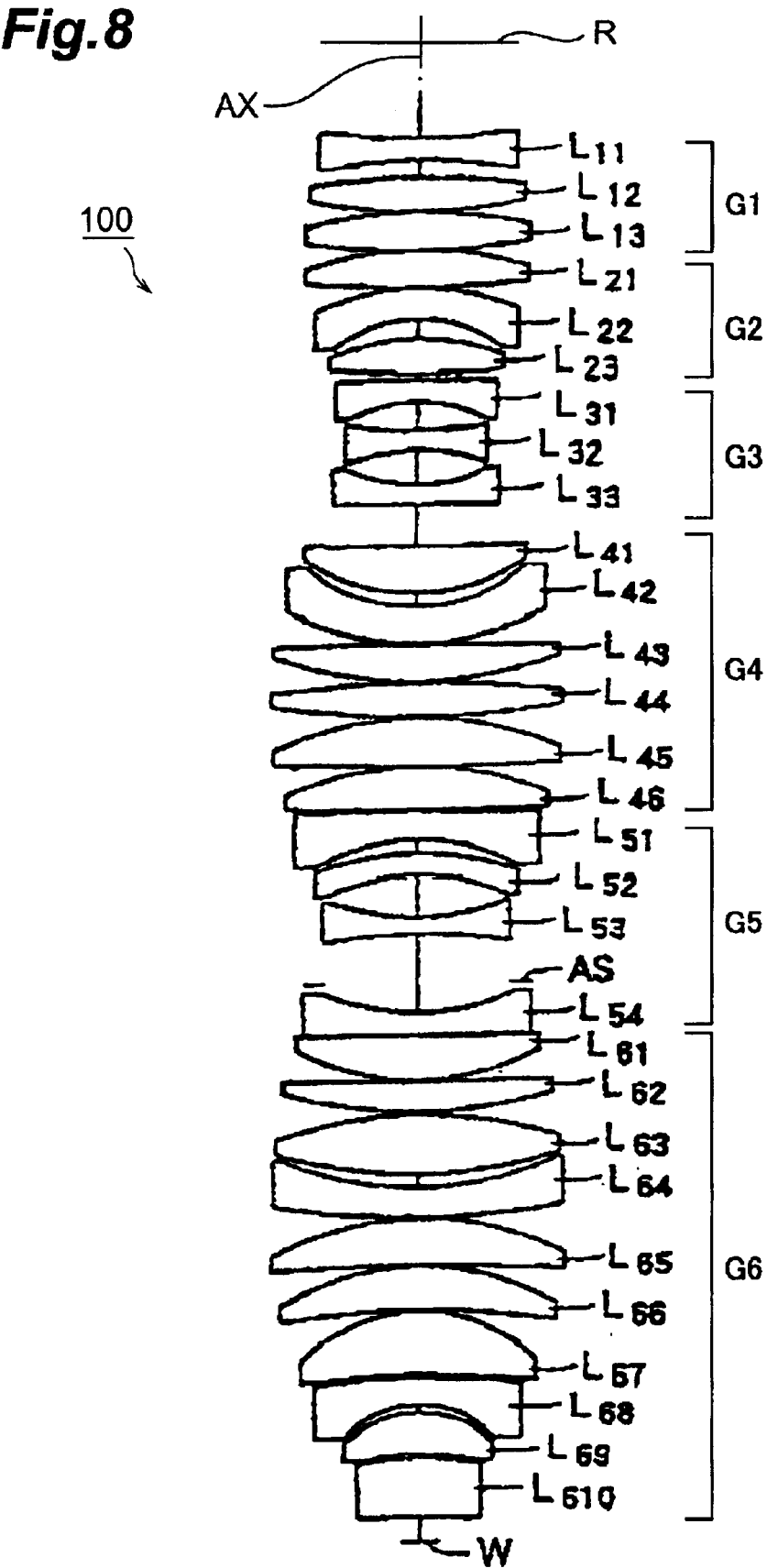
FIG. 8 is a schematic view to show an example of an optical system according to the present invention.

An example of the projection optical system obtained in the above manner is shown in FIG. 8.

A projection optical system 100 shown in FIG. 8 comprises, sequentially from the side of a reticle R as a first object, a first lens group G1 having positive power, a second lens group G2 having positive power, a third lens group G3 having negative power, a fourth lens group G4 having positive power, a fifth lens group G5 having negative power, and a sixth lens group G6 having positive power. The projection optical system is almost telecentric on the object side (reticle R side) and image side (wafer W side) and has a reduction magnification. The N.A. of the projection optical system is 0.6, and the projection magnification is ¼.

In this projection optical system, single-crystal calcium fluoride is used for six portions $L_{45}$, $L_{46}$, $L_{63}$, $L_{65}$, $L_{66}$, and $L_{67}$ for the purpose of correcting chromatic aberration.

For the above projection optical system of the present invention, the signed birefringence characteristic value of the entire projection optical system is calculated for optical members $L_{11}$ to $L_{610}$ from the distribution of signed birefringence values in the plane which is centered on the intersection to an optical axis Z and is perpendicular to the optical axis Z by the calculation methods using expressions (1) to (6), and the optical members are combined to satisfy a layout condition that the signed birefringence characteristic value of the entire projection optical system becomes −0.5 to +0.5 nm/cm.

In the projection optical system of the present invention, the optical members are preferably combined to satisfy another layout condition that the Strehl value of the signed birefringence value based on the effective optical path of the entire projection optical system becomes 0.93 or more.

The present inventors found for the evaluation of the birefringence distribution in an optical member that it is effective to use the Strehl intensity of a signed birefringence value considering the effective optical path at the center and its peripheral portion of the optical member effective cross-section. The Strehl value of birefringence, which is introduced by the present inventors for the first time, considers the effective optical path of a light beam passing through the effective cross-section. For this reason, the birefringence distribution in an optical member can be more precisely evaluated using evaluation based on the signed birefringence characteristic value of the entire optical system together.

The layout condition of each optical member based on the Strehl value of the signed birefringence value is expressed on the basis of $$0.93 \leq S \quad (7)$$

$$S = \prod_{i=1}^{m} S_i \quad (8)$$

$$S_i = 1 - \left(\frac{2\pi}{\lambda}\right)^2 \cdot \left(\frac{\sigma^2}{2} + \frac{|X|^2}{4}\right) \quad (9)$$

[where $\lambda$ is the wavelength of the light source, $\chi$ is the average value of signed birefringence values, which is determined from the distribution of signed birefringence values in the effective radial direction, based on the effective optical path obtained for the optical member $L_i$ by a ray-tracing test in the entire projection optical system, $\sigma$ is the standard deviation of signed birefringence values, which is determined from the distribution of signed birefringence values in the effective radial direction, based on the effective optical path obtained for the optical member $L_i$ by a ray-tracing test in the entire projection optical system, $S_i$ is the Strehl intensity of the signed birefringence value based on the effective optical path for each optical member $L_i$, and S is the Strehl intensity of the signed birefringence value based on the effective optical path in the entire projection optical system when all the optical members $L_i$ are combined].

In the projection optical system according to the present invention, a signed birefringence value near the center O of the optical member $L_i$ is preferably 0.2 nm/cm or less. Most components of light with which the optical member is irradiated have optical axes at the central portion of the optical member. For this reason, when an optical member satisfying the above condition is used, the influence of birefringence can be largely reduced as compared to a case wherein an optical member having birefringence at the central portion is used.

In the projection optical system according to the present invention, the radial distribution of the average signed birefringence values $B_{ij}$ in the optical member $L_i$ preferably has no extremal value except at the center $O_i$. When the distribution of signed birefringence values of the optical member has no extremal value except at the center, the signed birefringence characteristic value of the entire optical system can be easily estimated, so desired optical performance can be obtained by effectively canceling the influence of birefringence between the individual members.

In addition, in the projection optical system according to the present invention, a difference $\Delta B_i$ between the maximum value and the minimum value of the radial distribution of the average signed birefringence values $B_{ij}$ in the optical member $L_i$ is preferably 2.0 nm/cm or less. That the difference $\Delta B_i$ between the maximum value and the minimum value of the radial distribution of the average signed birefringence values $B_{ij}$ is large represents that the variation in average signed birefringence value $B_{ij}$ of the optical member, and more specifically, signed birefringence value $A_{ijk}$ is large. When an optical member for which the difference $\Delta B_i$ between the maximum value and the minimum value of the radial distribution of the average signed birefringence values $B_{ij}$ is larger than 1.0 nm/cm is irradiated with light, the wavefront of the light beam is disturbed because the difference in signed birefringence value $A_{ijk}$ is large depending on the position where the light passes through, so the imaging performance of the optical system tends to extremely degrade.

Furthermore, in the projection optical system according to the present invention, a maximum value $F_i$ of gradient of the radial distribution curve of the average signed birefringence values $B_{ij}$ in each optical member $L_i$ is preferably 0.2 nm/cm or less for a radial width of 10 mm. When a projection optical system is constructed using such an optical member, satisfactory imaging performance of the projection optical system can be obtained, and in the projection exposure apparatus having such a projection optical system, a uniform resolution can be obtained across the wafer surface. Like the case wherein the difference $\Delta B_i$ between the maximum value and the minimum value of the radial distribution of the average signed birefringence values $B_{ij}$ is large, that the maximum value $F_i$ of gradient of the radial distribution curve of the average signed birefringence values $B_{ij}$ is large represents that the variation in average signed birefringence value $B_{ij}$ of the optical member, and more specifically, signed birefringence value $A_{ijk}$ is large. When an optical member for which the maximum value $F_i$ of gradient of the radial distribution curve of the average signed birefringence values $B_{ij}$ is larger than 0.2 nm/cm is irradiated with light, the wavefront of the light beam is disturbed because the difference in signed birefringence value $A_{ijk}$ is large depending on the position where the light passes through, so the imaging performance of the optical system tends to extremely degrade.

Figure 9:
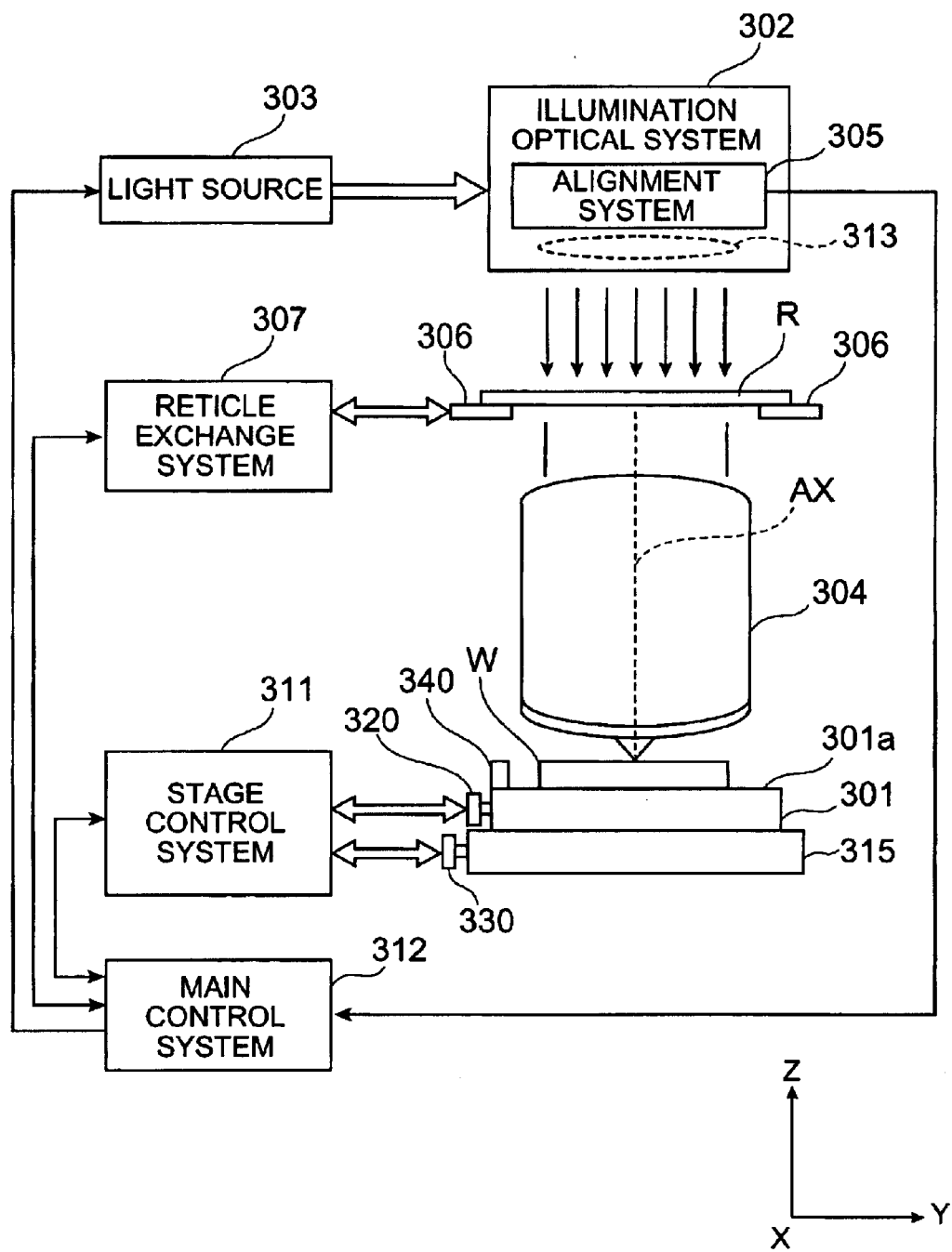
FIG. 9 is a schematic diagram to show an example of a projection exposure apparatus according to the present invention.

An example of a projection exposure apparatus having the projection optical system shown in FIG. 8 is shown in FIG. 9.

The projection exposure apparatus shown in FIG. 9 mainly comprises an exposure light source 303, a reticle R having a pattern original image, an irradiation optical system 302 for irradiating the reticle R with light output from the exposure light source 303, a projection optical system 304 for projecting the pattern image output from the reticle R onto a wafer (photosensitive substrate) W, and an alignment system 305 for performing alignment between the reticle R and the wafer W.

The wafer W is placed on a leveling stage (not shown). This leveling stage is set on a Z-stage 301 which can be finely moved by a drive motor 320 in the direction of optical axis (Z-direction) of the projection optical system. The z-stage 301 is placed on an X-Y stage 315 which can be moved by the driving motor 320 in the two-dimensional (X-Y) direction by a step-and-repeat scheme. The reticle R is placed on a reticle stage 306 two-dimensionally movable in a horizontal plane. The pattern formed on the reticle R is uniformly illuminated with exposure light from the exposure light source 303 through the irradiation optical system 302, so the pattern image on the reticle R is exposed/transferred to a shot region of the wafer W by the projection optical system 304. As this exposure light, exposure light having a wavelength of 248 nm (KrF excimer laser), 193 nm (ArF excimer laser), or 157 nm ($F_2$ laser) can be used.

When transfer/exposure of the pattern of the reticle R to one shot region on the wafer W is ended, the X-Y stage 315 is moved stepwise such that the next shot region on the wafer W matches the exposure region of the projection optical system 304. The two-dimensional position of the leveling stage on which the wafer W is placed is always monitored at a resolution of, e.g., about 0.01 $\mu$m by measuring the distance from a movable mirror 340 fixed on the leveling stage using a laser interferometer (not shown). The output from the laser interferometer is supplied to a stage control system 311.

The reticle R is aligned on the reticle stage 306 such that the center of the transfer pattern on the reticle R matches an optical axis AX of the projection optical system 304. The reticle R is aligned using a plurality of reticle alignment marks (reticle marks) formed near the outer periphery of the reticle R. The reticle marks are classified into two types: reticle marks for alignment in the X direction and reticle marks for alignment in the Y direction. The alignment system 305 uses, as illumination light (alignment light), exposure light split and extracted from exposure light from the exposure light source 303. One alignment system 305 is provided at each reticle alignment mark position.

Illumination light passing through the irradiation optical system 302 becomes incident on the reticle marks formed outside the pattern region of the reticle R. Each reticle mark is made of a transparent rectangular window formed in the opaque portion around the pattern. The alignment light component reflected by the reticle mark portion enters the alignment system 305 again. On the other hand, the alignment light component transmitted through the reticle mark strikes substrate alignment marks (wafer marks) formed around each shot region on the wafer W through the projection optical system 304. Instead of forming wafer marks around each shot region, they may be formed at a predetermined position of the wafer, for example, only in the outer peripheral region of the wafer. The wafer marks are also classified into two types: wafer marks for alignment in the X direction in correspondence with the reticle marks and wafer marks for alignment in the Y direction. The reflected light from the wafer marks propagates through a route opposite to that of the incident light and enters the alignment system 305 again through the projection optical system 304 and reticle mark portions.

The alignment system 305 thus receives reflected alignment light from the reticle R and wafer W, thereby detecting the relative positions of the reticle R and wafer W. The output from the alignment system 305 is supplied to a main control system 312. The output from the main control system 312 is supplied to a reticle exchange system 307 and stage control system 311, thereby adjusting the spatial positions of the reticle R and wafer W. As a result, the overlay accuracy between the pattern formed in each shot region on the wafer W and the pattern image on the reticle R to be transferred/exposed can be accurately maintained.

FIGS. 10A and 10B are schematic views to show the detailed structure of the irradiation optical system 302 of the projection exposure apparatus shown in FIG. 9.

FIG. 10A is a front view of the irradiation optical system 302 when viewed from the Y direction in FIG. 9. FIG. 10B is a front view of the irradiation optical system 302 when viewed from the X direction in FIG. 9. In either drawing, the alignment system 302 which splits and uses part of exposure light incident on the irradiation optical system 302 is omitted.

The exposure light source 303 (not shown) outputs an almost parallel light beam having a wavelength of 248 nm (KrF excimer laser), 193 nm (ArF excimer laser), or 157 nm ($F_2$ laser). The parallel light beam at this time has a rectangular cross-section. The parallel light beam from the exposure light source 303 becomes incident on a beam shaping optical system 20 serving as a light beam shaping section for shaping the light beam into a light beam having a predetermined sectional shape. The beam shaping optical system 20 is constructed by two cylindrical lenses (20A and 20B) having refracting power in the Y direction. The cylindrical lens 20A on the light source side has negative refracting power and diverges the light beam in the X direction. The cylindrical lens 20B on the irradiated surface side has positive refracting power and condenses the divergent light beam from the cylindrical lens A on the light source side to convert the light beam into a parallel light beam. Hence, the parallel light beam from the exposure light source 303 through the beam shaping optical system 20 is shaped into a rectangular light beam that has a larger Y-direction beam width and a cross-section with a predetermined size. As the beam shaping optical system 20, a system combining cylindrical lenses having positive refracting power may be used, or an anamorphic prism or the like may be used.

The shaped light beam from the beam shaping optical system 20 becomes incident on a first relay optical system 21. The first relay optical system 21 has a front group (21A and 21B) having two positive lens and positive refracting power and a rear group (21C and 21D) having two positive lens and positive refracting power. The front group (21A and 21B) of the first relay optical system 21 forms a focal point (light source image) I at the focal position on the reticle R side (rear side) of the front group. The rear group (21C and 21D) of the first relay optical system 21 is arranged such that the focal position on the light source side (front side) matches the focal position of the front group (21A and 21B). The first relay optical system 21 has a function of making the emitting surface of the exposure light source 303 conjugate to the incident surface of an optical integrator 30 serving as a first multi-source image formation means. With the function of this first relay optical system 21, the shift of light beam with which the optical integrator 30 is illuminated according to the angle shift of light from the exposure light source 303 is corrected, and the allowance for the angle shift of light from the exposure light source 303 is increased. A guide optical system for guiding the light from the exposure light source 303 to the first multi-source image formation means is formed from the beam shaping optical system 20 and first relay optical system 21.

The light beam passing through the first relay optical system 21 becomes incident on the optical integrator 30 serving as a first multi-source image formation means for forming a plurality of light source images linearly arranged in three lines. This optical integrator 30 is formed by laying out a plurality of double-convex lens elements each having an almost square lens section, and the optical integrator 30 has a rectangular cross-section as a whole. Each double-convex lens element has the same curvature (refracting power) in the Y and X directions.

For this reason, the parallel light beam passing through each lens element of the optical integrator 30 is condensed to form a light source image on the exit side of the lens element. Hence, a plurality of light source images in number corresponding to the lens elements are formed at an exit-side position A1 of the optical integrator 30, where secondary sources are substantially formed.

Light beams from the plurality of secondary sources formed by the optical integrator 30 are condensed by a second relay optical system 40 and enter an optical integrator 50 serving as a second multi-source image formation means for forming a plurality of light source images.

This optical integrator 50 is formed by laying out a plurality of double-convex lens elements each having a rectangular lens section. Each lens element is designed to have a sectional shape similar to that of the optical integrator 30. The optical integrator 50 has a square cross-section as a whole. Each lens element has the same curvature (refracting power) in the directions of drawing surfaces of FIGS. 10A and 10B.

For this reason, the light beam passing through each lens element of the optical integrator 50 is condensed to form a light source image on the emerging side of the lens element. Hence, a plurality of light source images arrayed in a square are formed at an exit-side position A2 of the optical integrator 50, where tertiary sources are substantially formed.

The second relay optical system 40 makes an incident surface position B1 of the optical integrator 30 conjugate to an incident surface position B2 of the optical integrator 50, and the exit-side position A1 of the optical integrator 30 conjugate to the exit-side position A2 of the optical integrator 50. In the above description, the optical integrators 30 and 50 have been described as components each having a fly-eye lens shape. However, the shape of the optical integrator used in the illumination system of the projection exposure apparatus of the present invention is not particularly limited. For example, a micro fly-eye formed from a plurality of very small lens elements, a rod-shaped internal reflection type optical element (kaleidoscope rod), or a diffraction optical element (DOE) can be used.

An aperture stop AS having an aperture portion in a predetermined shape is placed at or near the position A2 where the tertiary sources are formed. The light beams from the tertiary sources, which are formed into a circular shape through the aperture stop AS, are condensed by a condenser optical system 60 serving as a condensing optical system so that the reticle R as an illuminated object is uniformly illuminated in a slit shape.

For the projection optical system 304 shown in FIG. 11, optical members are combined to satisfy a layout condition that the signed birefringence characteristic value of the entire projection optical system becomes −0.5 to +0.5 nm/cm. In addition, the optical members are combined to satisfy another layout condition that the Strehl value of the signed birefringence value based on the effective optical path of the entire projection optical system becomes 0.93 or more. Furthermore, for each optical member used, the signed birefringence value near the center of the effective cross-section is −0.2 to +0.2 nm/cm, the radial distribution of average signed birefringence values has no extremal value except at the center, the difference $\Delta B_i$ between the maximum value and the minimum value of the average signed birefringence values is 2.0 nm/cm or less, and the maximum value $F_i$ of gradient of the radial distribution curve of the average signed birefringence values is 0.2 nm/cm or less for a radial width of 10 mm.

The present invention will be described below in more detail on the basis of examples and comparative examples. However, the present invention is not limited to the examples below.

EXAMPLE 1

A silica glass member was manufactured according to the following procedure using the synthesizing furnace shown in FIG. 4.

Figure 11A:
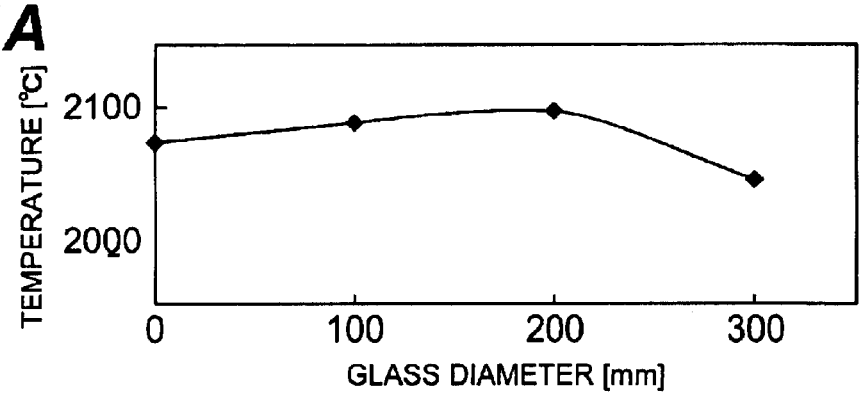
FIGS. 11A to 11D are graphs to show the correlations between the glass diameter and the temperature in the silica glass ingot manufacturing processes of Examples 1 to 3 and Comparative Example 1 of the present invention.

First, silicon tetrachloride ($SiCl_4$) was injected from the central portion of the burner having a multi-tubular structure at a flow speed of 30 g/min and hydrolyzed in an oxyhydrogen flame (oxygen/hydrogen ratio: 0.5) to obtain fine silica glass particles. The fine silica glass particles were deposited on a target (rotational speed: 5 rpm, oscillation speed: 100 mm/min) and simultaneously vitrified to obtain a silica glass ingot (diameter: 400 mm or more). FIG. 11A shows the temperature distribution in a plane perpendicular to the rotational axis of the ingot in this process.

A cylindrical silica glass member (diameter: 400 mm, thickness: 100 mm) was cut from the resultant silica glass ingot such that the rotation center of the silica glass ingot matched the geometric center of the silica glass member. The resultant structure was heated to 1,000 hrs, held at that temperature for 10 hrs, cooled to 500° C. at a cooling rate of 10° C./hr, and then naturally cooled (annealing).

Figure 12A:
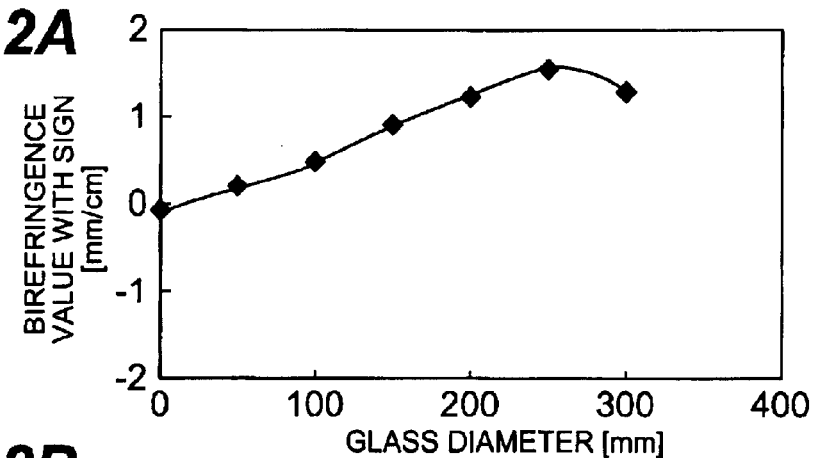
FIGS. 12A to 12D are graphs to show the correlations between the glass diameter and the signed birefringence value in silica glass members obtained in Examples 1 to 3 and Comparative Example 1 of the present invention.

For the resultant silica glass member, signed birefringence values were measured by the phase modulation method. The result is shown in FIG. 12A.

EXAMPLE 2

Figure 11B:
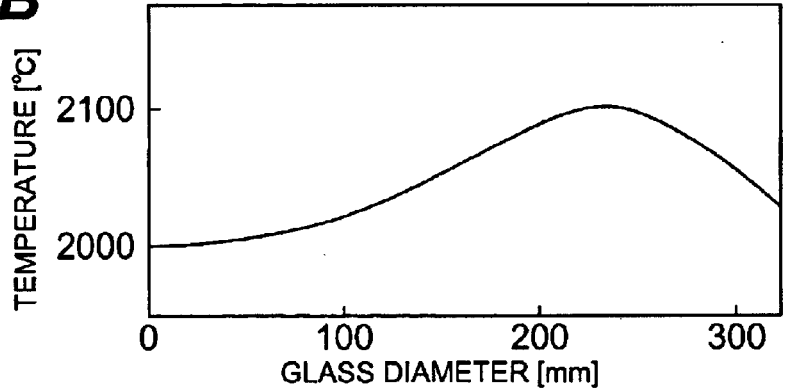
Figure 12B:
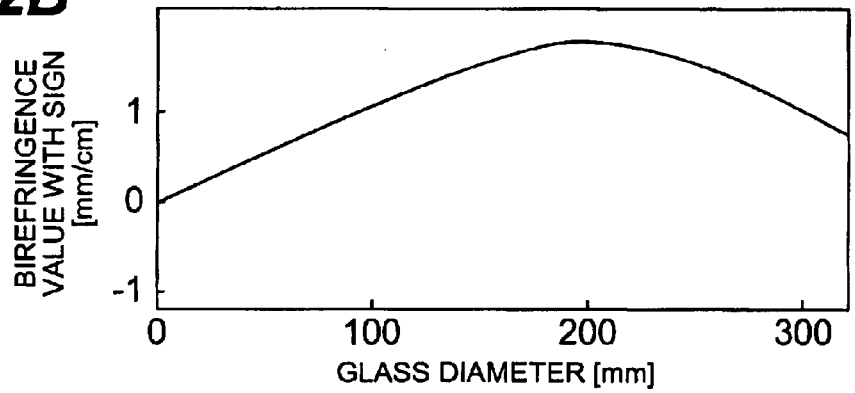

A silica glass member was obtained according to the same procedure as in Example 1 except that the flow speed of silicon tetrachloride was set to 100 g/min, and condition 1 shown in Table 1 was used as the condition for annealing, and signed birefringence values were measured. The temperature distribution in manufacturing a silica glass ingot is shown in FIG. 11B, and the measurement result of signed birefringence values is shown in FIG. 12B.

EXAMPLE 3

Figure 11C:
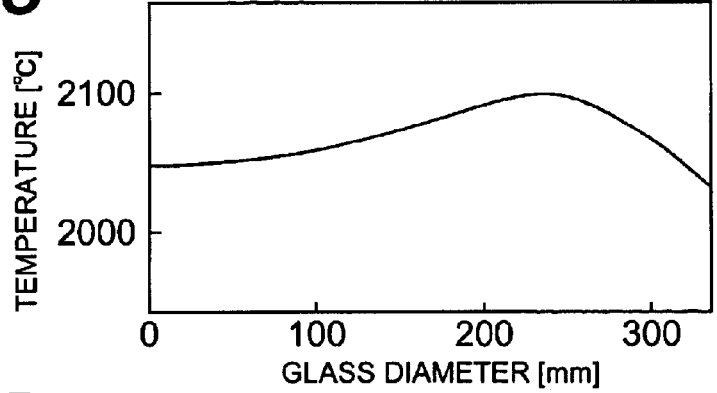
Figure 12C:
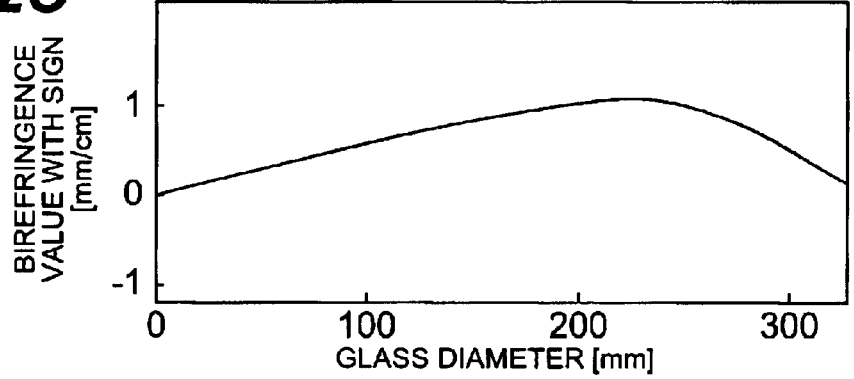

A silica glass member was obtained according to the same procedure as in Example 2 except that the flow speed of silicon tetrachloride was set to 50 g/min, and signed birefringence values were measured. The temperature distribution in manufacturing a silica glass ingot is shown in FIG. 11C, and the measurement result of signed birefringence values is shown in FIG. 12C.

COMPARATIVE EXAMPLE 1

Figure 11D:
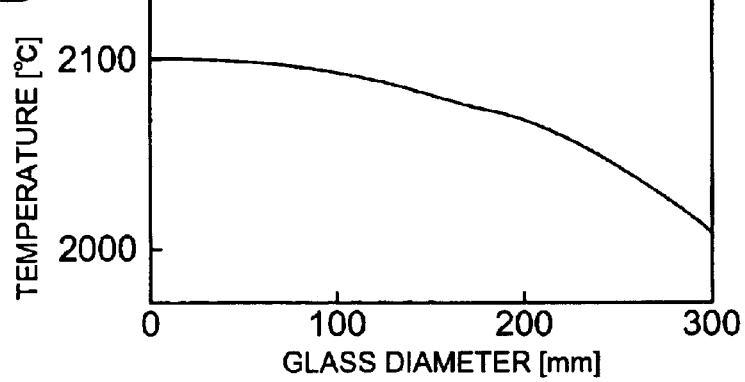
Figure 12D:
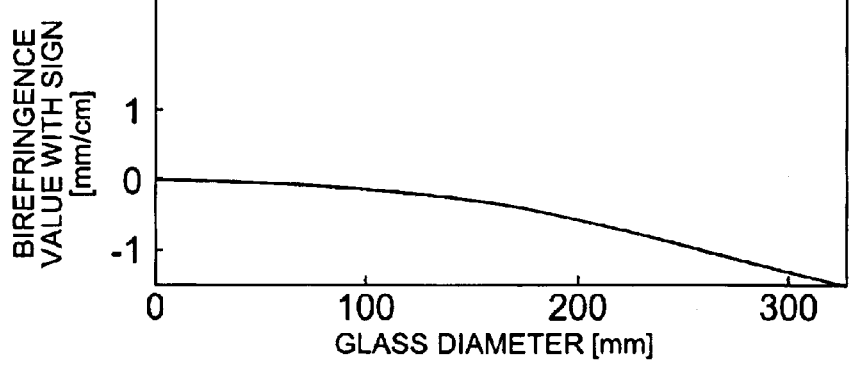

A silica glass member was obtained according to the same procedure as in Example 2 except that the flow speed of silicon tetrachloride was set to 10 g/min, and signed birefringence values were measured. The temperature distribution in manufacturing a silica glass ingot is shown in FIG. 11D, and the measurement result of signed birefringence values is shown in FIG. 12D.

EXAMPLE 4

Figure 13A:
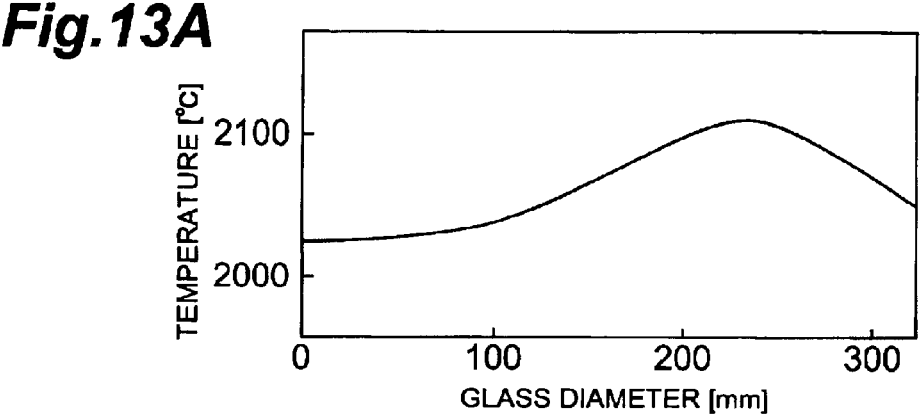
FIGS. 13A to 13D are graphs to show the correlations between the glass diameter and the temperature in the silica glass ingot manufacturing processes of Examples 4 and 5 and Comparative Examples 2 and 3 of the present invention.
Figure 14A:
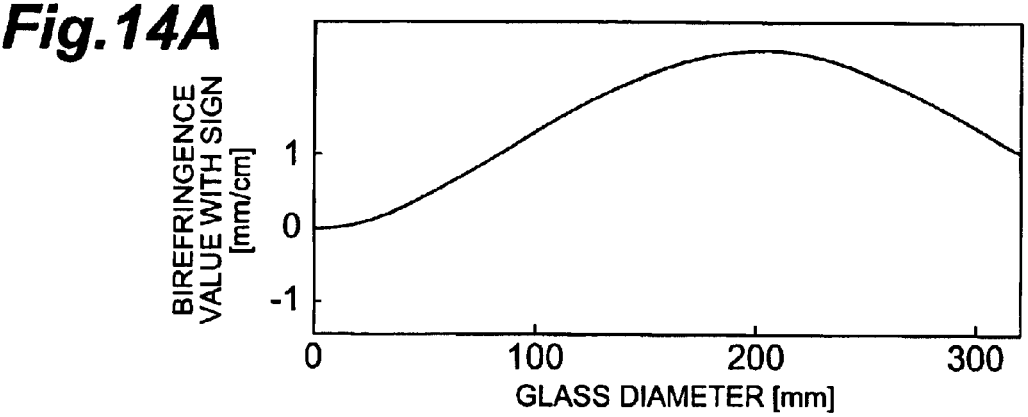
FIGS. 14A to 14D are graphs to show the correlations between the glass diameter and the signed birefringence value in silica glass members obtained in Examples 4 and 5 and Comparative Examples 2 and 3 of the present invention.

A silica glass member was obtained according to the same procedure as in Example 1 except that the oxygen/hydrogen ratio was set to 0.25, and condition 1 shown in Table 1 was used as the condition for annealing, and signed birefringence values were measured. The temperature distribution in manufacturing a silica glass ingot is shown in FIG. 13A, and the measurement result of signed birefringence values is shown in FIG. 14A.

EXAMPLE 5

Figure 13B:
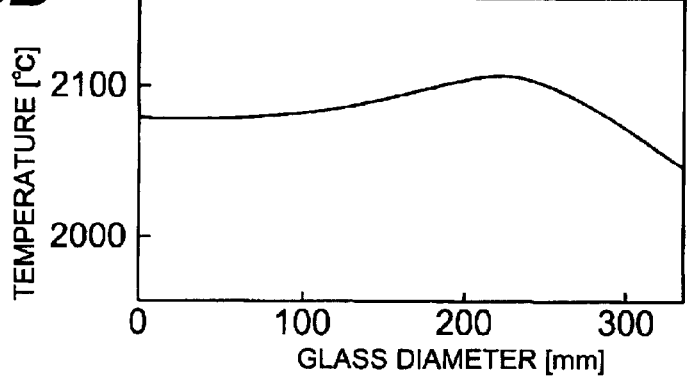
Figure 14B:
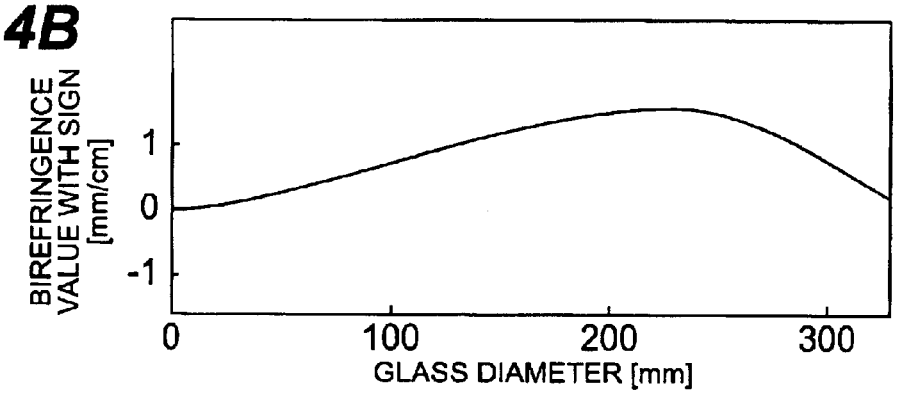

A silica glass member was obtained according to the same procedure as in Example 4 except that the oxygen/hydrogen ratio was set to 0.4, and signed birefringence values were measured. The temperature distribution in manufacturing a silica glass ingot is shown in FIG. 13B, and the measurement result of signed birefringence values is shown in FIG. 14B.

COMPARATIVE EXAMPLE 2

Figure 13C:
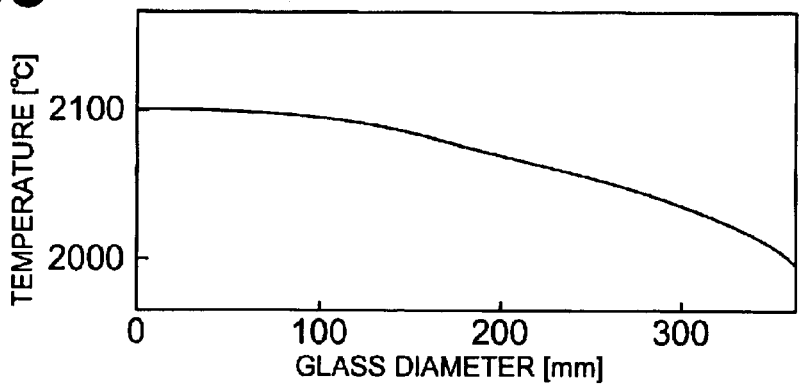
Figure 14C:
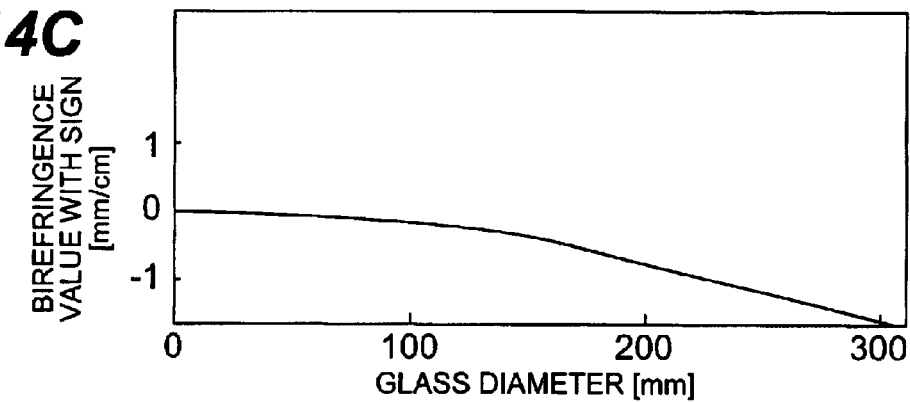

A silica glass member was obtained according to the same procedure as in Example 4 except that the oxygen/hydrogen ratio was set to 0.5, and signed birefringence values were measured. The temperature distribution in manufacturing a silica glass ingot is shown in FIG. 13C, and the measurement result of signed birefringence values is shown in FIG. 14C.

COMPARATIVE EXAMPLE 3

Figure 13D:
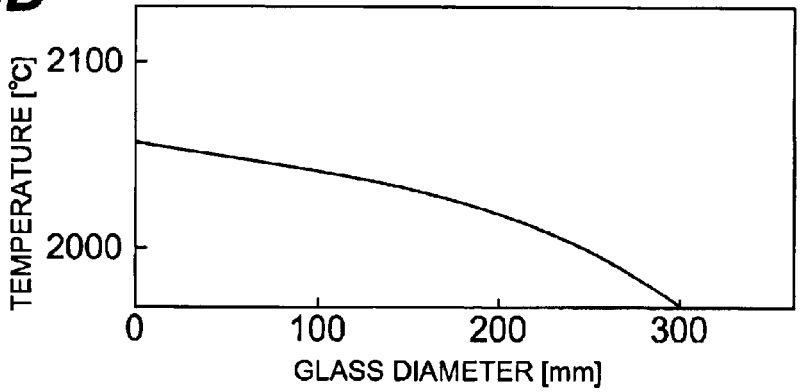
Figure 14D:
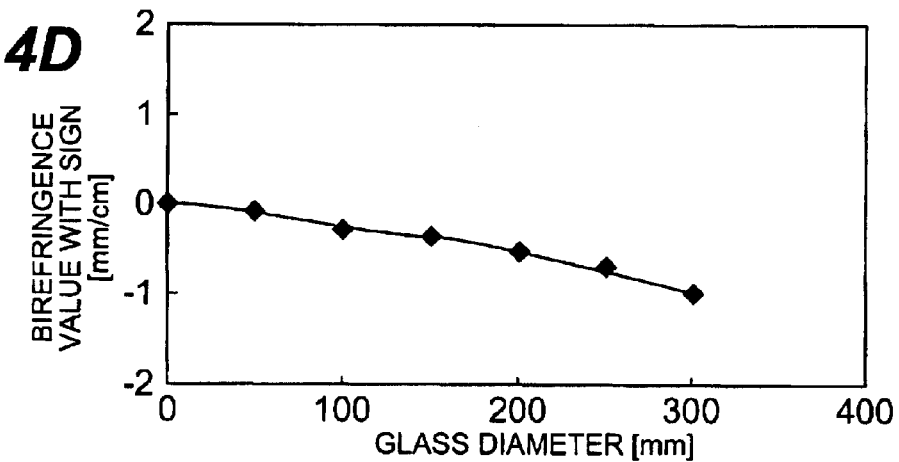

A silica glass member was obtained according to the same procedure as in Example 1 except that the oxygen/hydrogen ratio in Example 1 was set to 0.45, and signed birefringence values were measured. The temperature distribution in manufacturing a silica glass ingot is shown in FIG. 13D, and the measurement result of signed birefringence values is shown in FIG. 14D.

EXAMPLE 6

Figure 16A:
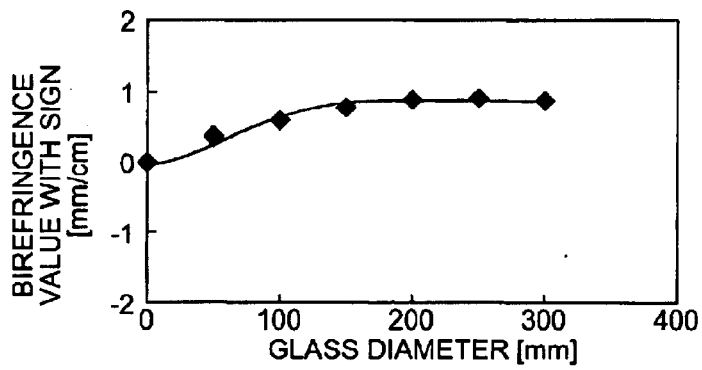
FIGS. 16A and 16B are graphs to show the correlations between the glass diameter and the signed birefringence value in silica glass members obtained in Examples 6 and 7 of the present invention.
Figure 16B:
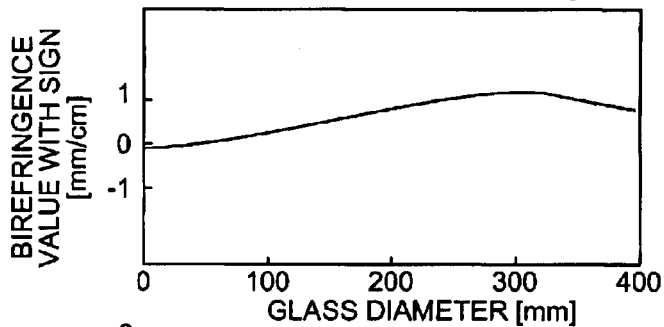
Figure 16C:
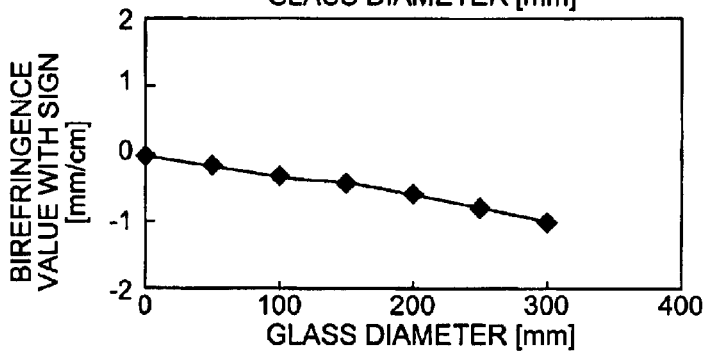
FIG. 16C is a graph to show the correlation between the glass diameter and the signed birefringence value in the silica glass member of Example 6 after high-temperature heat treatment.

For the silica glass member obtained in Example 1, high-temperature heat treatment was performed according to the same procedure as in Comparative Example 4, and signed birefringence values were measured. The result is shown in FIG. 16C.

Figure 15A:
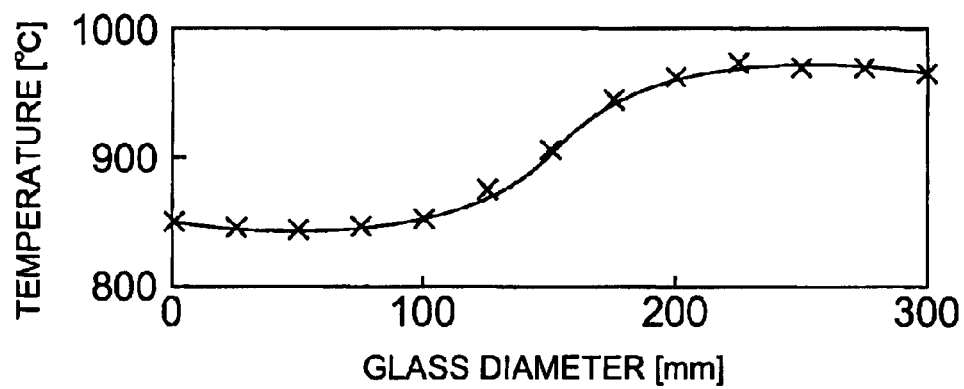
FIGS. 15A and 15B are graphs to show the correlations between the temperature and the glass diameter of a silica glass member in the heat treatment processes of Examples 6 and 7 of the present invention.

Next, for this silica glass member, annealing is performed under condition 1 shown in Table 1, and heat treatment and cooling were performed under condition 2 shown in Table 1 using the heat treatment apparatus shown in FIG. 6. For the resultant silica glass member, signed birefringence values were measured. The temperature distribution in the silica glass member five hours after the start of cooling is shown in FIG. 15A, and the distribution of signed birefringence values in the silica glass member after cooling is shown in FIG. 16A.

EXAMPLE 7

Figure 15B:
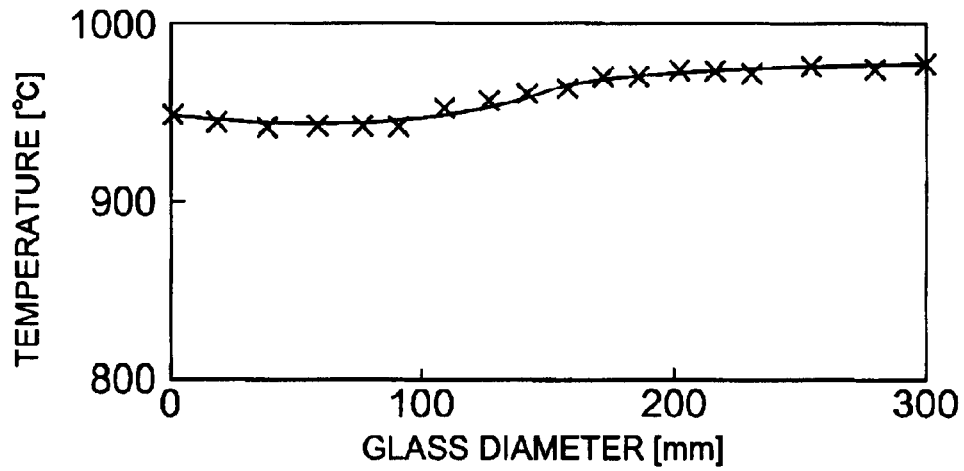

For the silica glass member after annealing in Example 6, heat treatment and cooling were performed under condition 2 shown in Table 1 except that cooling was performed by injecting dry air (temperature: 25° C., dew point: −70° C.) at 20 L/min from the upper and lower surfaces of the silica glass member, instead of using ceramic plates in the apparatus shown in FIG. 6. For the resultant silica glass member, signed birefringence values were measured. The temperature distribution in the silica glass member five hours after the start of cooling is shown in FIG. 15B, and the distribution of signed birefringence values in the silica glass member after cooling is shown in FIG. 16B.

TABLE 1

|  | Heating Time [hr] | Holding Temperature [° C.] | Holding Time [hr] | Cooling Rate [° C./hr] | Natural Cooling Temperature [° C.] | Difference Between Atmospheric Temperature and Ceramic Temperature [° C.] |
|---|---|---|---|---|---|---|
| Condition 1 | 4 | 1100 | 20 | 25 | 100 | — |
| Condition 2 | 4 | 1100 | 20 | 25 | 100 | 100 |

COMPARATIVE EXAMPLE 4

Figure 16D:
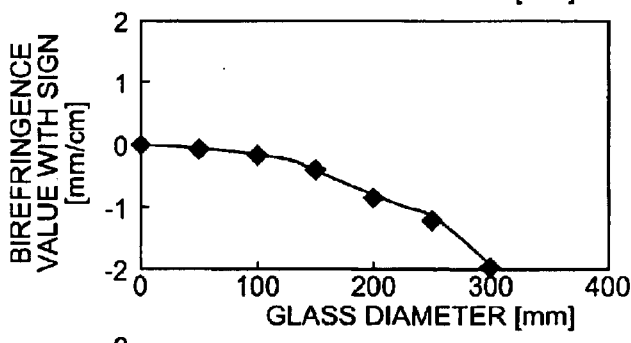
FIGS. 16D and 16E are graphs to show the correlations between the glass diameter and the signed birefringence value in silica glass members obtained in Comparative Examples 3 and 4.

The silica glass member obtained in Example 1 was heated to 2,100° C., held at that temperature for 2 hrs, cooled to 500° C. at a cooling rate of 10° C./hr, and then naturally cooled. For the silica glass member that underwent the high-temperature heat treatment, signed birefringence values were measured. The result is shown in FIG. 16D.

COMPARATIVE EXAMPLE 5

Figure 16E:
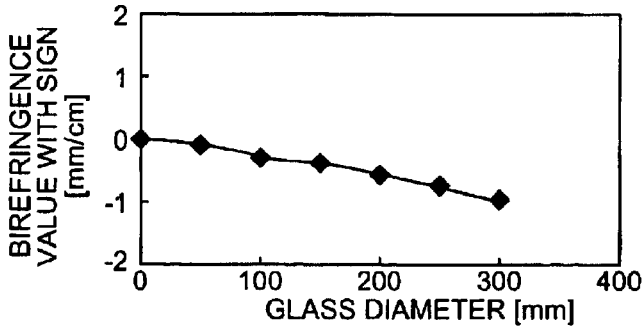

High-temperature heat treatment was performed according to the same procedure as in Comparative Example 4 except a silica glass member obtained as in Comparative Example 3 was used in place of the silica glass member obtained in Example 1 and the signed birefringence values of the resultant silica glass member were measured. The result is shown in FIG. 16E.

It was confirmed that all the silica glass members of Examples 1 to 7 had a distribution of signed birefringence values, in which the signed birefringence values monotonously radially increased from the center. To the contrary, all the silica glass members of Comparative Examples 1 to 5 had a distribution of signed birefringence values, in which the signed birefringence values monotonously radially decreased from the center.

(Manufacturing Projection Optical System 1 and Projection Exposure Apparatus 1)

The projection optical system shown in FIG. 8 was manufactured using the silica glass member of Example 1 and the silica glass member of Comparative Example 4 on the basis of the signed birefringence characteristic value obtained using expressions (1) to (6). For the resultant projection optical system, the birefringence of the entire optical system was evaluated on the basis of expressions (7) to (9). Generally, a projection optical system whose Strehl value is 0.95 or more can obtain desired performance. It was confirmed that the projection optical system obtained according to the above procedure could attain a Strehl value of 0.99 and had sufficiently high performance that was unavailable when a conventional optical member was used.

Next, the projection exposure apparatus shown in FIG. 9 was manufactured using the above projection optical system, and the resolution was evaluated. It was confirmed that this projection exposure apparatus attained a resolution of about 0.15 μm.

(Manufacturing Projection Optical System 2 and Projection Exposure Apparatus 2)

The projection optical system shown in FIG. 8 was manufactured using the silica glass member after the high-temperature heat treatment in Example 6 and the silica glass member after cooling in Example 6 on the basis of the signed birefringence characteristic value obtained using expressions (1) to (6). For the resultant projection optical system, the birefringence of the entire optical system was evaluated on the basis of expressions (7) to (9). It was confirmed that the projection optical system thus obtained could also attain a Strehl value of 0.99 and had sufficiently high performance that was unavailable when a conventional optical member was used.

Next, the projection exposure apparatus shown in FIG. 9 was manufactured using the above projection optical system, and the resolution was evaluated. It was confirmed that a resolution of about 0.15 μm was attained.

(Manufacturing Projection Optical System 3)

Figure 17:
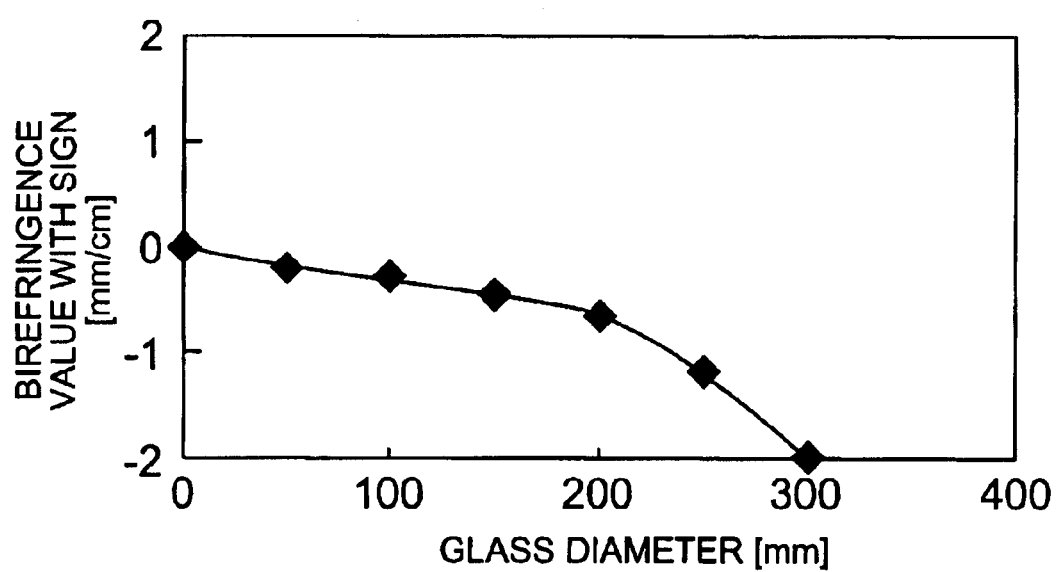
FIG. 17 is a graph to show the correlation between the glass diameter and the signed birefringence value in a silica glass member used to manufacture an optical system 3 of an example of the present invention.
Figure 18A:
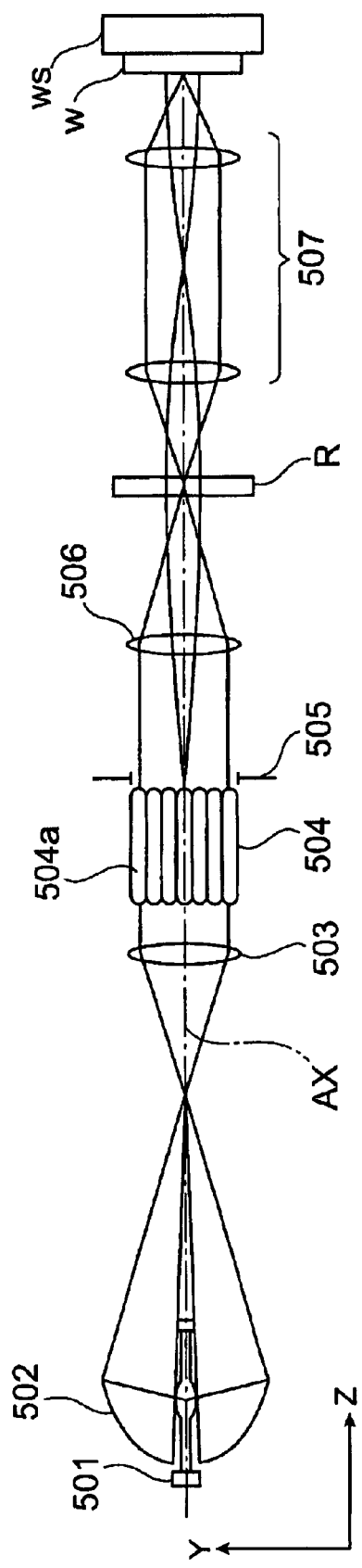
FIG. 18A is a schematic view to show an example of a conventional projection exposure apparatus.
Figure 18B:
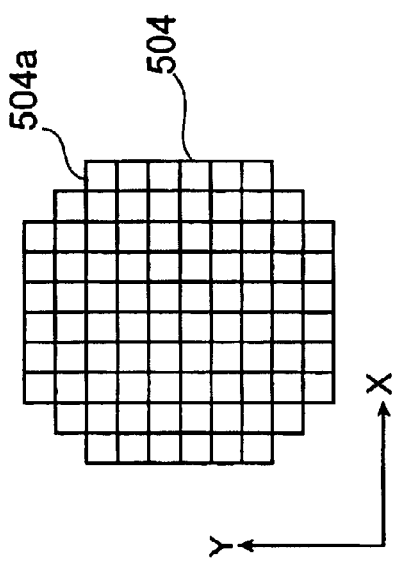
FIG. 18B is a sectional view to show an example of a fly-eye lens used in the projection exposure apparatus shown in FIG. 18A.

The same projection optical system as that shown in FIG. 8 was manufactured using only a conventional silica glass member which had a distribution of signed birefringence values shown in FIG. 17. For the resultant projection optical system, the birefringence of the entire optical system was evaluated on the basis of expressions (7) to (9). It was confirmed that Strehl value of the projection optical system thus obtained was 0.70, and desired optical performance could not be obtained.

Industrial Applicability

As has been described above, according to the manufacturing method of the present invention, a silica glass member whose signed birefringence value monotonously increases from the center to the peripheral portion can be efficiently and properly obtained. When the silica glass member of the present invention, which is obtained by the manufacturing method of the present invention, and the conventional silica glass member whose signed birefringence value monotonously decreases from the center to the peripheral portion are used, a high transmittance or highly uniform refractive index in the entire optical system can be achieved. Hence, according to the manufacturing method or the present invention and the silica glass member obtained by the method, a sufficiently high resolution can be efficiently and properly obtained in the imaging optical system of a projection exposure apparatus.

What is claimed is:

1. A method of manufacturing a silica glass member, comprising:

a first step of making a silicon compound react in oxyhydrogen flame using a burner having a multi-tubular structure to obtain fine silica glass particles;

a second step of depositing the fine silica glass particles on a support rotating and placed to oppose the burner to obtain a silica glass ingot with a temperature distribution in at least one plane perpendicular to a rotational axis of the silica glass ingot, the temperature distribution being symmetrical with respect to the rotational axis and having a maximal value between a center and a peripheral portion of the plane; and a third step of obtaining a distribution of signed birefringence values on the basis of birefringence values and directions of phase advance axes measured at a plurality of points in the plane perpendicular to the rotational axis of the silica glass ingot and cutting, from the silica glass ingot, a silica glass member whose signed birefringence values monotonously increase from the center to the peripheral portion of the plane.

2. A manufacturing method according to claim 1, wherein in the second step, a difference between the maximal value and a temperature at the center of the plane exceeds 0° C. and is not more than 200° C.

3. A method of manufacturing a silica glass member, comprising:

a step of heating a silica glass ingot to a predetermined temperature;

a step of cooling the silica glass ingot with a temperature distribution in at least one plane perpendicular to a rotational axis of the silica glass ingot, the temperature distribution being symmetrical with respect to the rotational axis and having a maximal value between a center and a peripheral portion of the plane; and a step of obtaining a distribution of signed birefringence values on the basis of birefringence values and directions of phase advance axes measured at a plurality of points in the plane perpendicular to the rotational axis of the silica glass ingot and cutting, from the silica glass ingot, a silica glass member whose signed birefringence values monotonously increase from the center to the peripheral portion of the plane.

4. A manufacturing method according to claim 3, wherein in the step of cooling, a difference between the maximal value and a temperature at the center of the plane is 20° C. to 300° C.

5. A silica glass member having a distribution of signed birefringence values which monotonously increase from a center to a peripheral portion of a plane of the glass member, said silica glass member being obtained by a manufacturing method comprising:

a first step of making a silicon compound react in oxyhydrogen flame using a burner having a multi-tubular structure to obtain fine silica glass particles;

a second step of depositing the fine silica glass particles on a support rotating and placed to oppose the burner to obtain a silica glass ingot with a temperature distribution in at least one plane perpendicular to a rotational axis of the silica glass ingot, the temperature distribution being symmetrical with respect to the rotational axis and having a maximal value between the center and the peripheral portion of the plane; and a third step of obtaining a distribution of signed birefringence values on the basis of birefringence values and directions of phase advance axes measured at a plurality of points in the plane perpendicular to the rotational axis of the silica glass ingot and cutting, from the silica glass ingot, a silica glass member whose signed birefringence values monotonously increase from the center to the peripheral portion of the plane of the glass member, and a maximum value of a gradient of a radial distribution curve of average signed birefringence values is 0.2 nm/cm or less for a radial width of 10 mm.

6. A silica glass member according to claim 5, wherein in the second step, a difference between the maximal value and a temperature at the center of the plane exceeds 0° C. and is not more than 200° C.

7. A silica glass member having a distribution of signed birefringence values, in which the signed birefringence values monotonously increase from a center to a peripheral portion of a plane of the glass member, said silica glass member being obtained by a manufacturing method comprising:

a step of heating a silica glass ingot to a predetermined temperature;

a step of cooling the silica glass ingot with a temperature distribution in at least one plane perpendicular to a rotational axis of the silica glass ingot, the temperature distribution being rotationally symmetrical with respect to the center of the plane and having a maximal value between the center and the peripheral portion of the plane; and a step of obtaining a distribution of signed birefringence values on the basis of birefringence values and directions of phase advance axes measured at a plurality of points in the plane perpendicular to the rotational axis of the silica glass ingot and cutting, from the silica glass ingot, a silica glass member whose signed birefringence values monotonously increase from the center to the peripheral portion of the plane of the glass member and a maximum value of a gradient of a radial distribution curve of average signed birefringence values is 0.2 nm/cm or less for a radial width of 10 mm.

8. A silica glass member according to claim 7, wherein in the step of cooling, a difference between the maximal value and a temperature at the center of the plane is 20° C. 300° C.

* * * * *